US012682824B2

(12) United States Patent
Won et al.

(10) Patent No.: US 12,682,824 B2
(45) Date of Patent: Jul. 14, 2026

(54) DISPLAY DEVICE, METHOD OF DRIVING THE DISPLAY DEVICE, AND ELECTRONIC DEVICE INCLUDING THE DISPLAY DEVICE

(71) Applicant: Samsung Display Co., LTD., Yongin-si (KR)

(72) Inventors: Yong Hoon Won, Yongin-si (KR); Seung Yong Synn, Yongin-si (KR); Jung Hoon Lee, Yongin-si (KR); Jung Sun Lee, Yongin-si (KR); Hyung Chul Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/627,667

(22) Filed: Apr. 5, 2024

(65) Prior Publication Data

US 2025/0087134 A1 Mar. 13, 2025

(30) Foreign Application Priority Data

Sep. 7, 2023 (KR) ........................ 10-2023-0119261

(51) Int. Cl.

*G09G 3/20* (2006.01)
*G09G 3/3241* (2016.01)
*G09G 3/3266* (2016.01)

(52) U.S. Cl.

CPC ......... *G09G 3/2096* (2013.01); *G09G 3/3241* (2013.01); *G09G 3/3266* (2013.01);
(Continued)

(58) Field of Classification Search

CPC ...... G09G 3/3233; G09G 3/3266; G09G 3/32; G09G 3/3258; G09G 3/3291; G09G 3/3225; G09G 3/3275; G09G 3/3208; G09G 3/30; G09G 3/20; G09G 2300/0819; G09G 2300/0861; G09G 2300/0842;
(Continued)

(56) References Cited

U.S. PATENT DOCUMENTS 9,607,562 B2 3/2017 Kim et al.
10,262,582 B2 4/2019 Han
(Continued)

FOREIGN PATENT DOCUMENTS

KR 102246262 B1 4/2021
KR 102425795 B1 7/2022
KR 102464557 B1 11/2022

*Primary Examiner* — Dong Hui Liang
(74) *Attorney, Agent, or Firm* — CANTOR COLBURN LLP

(57) ABSTRACT

A display device includes: pixels connected to scan lines, data lines, a first power line, a second power line, and a third power line, where each of the pixels includes a light emitting device and a driving transistor for controlling an amount of current supplied to the light emitting device; and a timing controller for generating output data by using input data. The pixels emit light in response to a data signal corresponding to the output data during a normal driving period, and receive a bias voltage during a recovery driving period in which the pixels do not emit light after the normal driving period. The timing controller is configured to control a length of the recovery driving period in response to the input data.

19 Claims, 20 Drawing Sheets

(52) U.S. Cl.
CPC ............... *G09G 2300/0819* (2013.01); *G09G 2300/0842* (2013.01); *G09G 2300/0861* (2013.01); *G09G 2320/0233* (2013.01); *G09G 2320/0257* (2013.01); *G09G 2320/0626* (2013.01); *G09G 2330/02* (2013.01); *G09G 2360/145* (2013.01)

(58) Field of Classification Search
CPC ... G09G 2300/0426; G09G 2300/0852; G09G 2300/0866; G09G 2300/0809; G09G 2300/0814; G09G 2310/08; G09G 2310/0251; G09G 2310/0262; G09G 2310/061; G09G 2320/0233; G09G 2320/045; G09G 2320/0247; G09G 2320/043; G09G 2330/021; G09G 2330/028
See application file for complete search history.

(56) References Cited

U.S. PATENT DOCUMENTS

| | | | | |
|---|---|---|---|---|
| 2012/0062536 | A1* | 3/2012 | Park ..................... | G09G 3/3233 345/82 |
| 2012/0147060 | A1* | 6/2012 | Jeong ................... | G09G 3/3233 345/82 |
| 2014/0347401 | A1* | 11/2014 | Hwang ................ | G09G 3/3233 345/82 |
| 2020/0027401 | A1 | 1/2020 | Park | |
| 2020/0193910 | A1 | 6/2020 | Park | |
| 2021/0366386 | A1* | 11/2021 | Gao ..................... | G09G 3/3258 |
| 2023/0032883 | A1 | 2/2023 | Park et al. | |
| 2023/0108865 | A1 | 4/2023 | Kim et al. | |
| 2023/0143180 | A1* | 5/2023 | Song .................... | G09G 3/2096 345/691 |
| 2023/0206842 | A1* | 6/2023 | Park ..................... | G09G 3/3233 345/212 |

* cited by examiner

First off-bias period

VDD1 > VDD2

FIG. 14

| | Vint2 -7V | Vint2 -5V | Vint2 -2.5V | Comparative Example |
|---|---|---|---|---|
| Initial | 9 | 10 | 10 | 10 |
| 2min | 5 | 7 | 6 | 9 |
| 4min | 5 | 6 | 5 | 8 |
| 6min | 4 | 5 | 5 | 7 |
| 8min | 3 | 4 | 4 | 6 |
| 10min | 1 | 3 | 4 | 6 |
| 12min | 1 | 2 | 3 | 5 |
| 14min | 0 | 1 | 2 | 4 |
| 16min | 0 | 0 | 1 | 4 |
| 18min | 0 | 0 | 0 | 3 |
| 48min | 0 | 0 | 0 | 3 |

FIG. 15

| Recovery Time | Comparative Example | First off-bias period | Second off-bias period |
|---|---|---|---|
| 0min. | 9 | 9 | 9 |
| 10min. | 3 | 1 | 1.5 |

DISPLAY DEVICE, METHOD OF DRIVING THE DISPLAY DEVICE, AND ELECTRONIC DEVICE INCLUDING THE DISPLAY DEVICE

This application claims priority to Korean Patent Application No. 10-2023-0119261, filed on Sep. 7, 2023, and all the benefits accruing therefrom under 35 U.S.C. § 119, the content of which in its entirety is herein incorporated by reference.

BACKGROUND

1. Field

An embodiment of the present disclosure relates to a touch panel and a display device.

2. Description of the Related Art

A display device includes a plurality of pixels. Each of the pixels includes a plurality of transistors, a light emitting element electrically connected to the transistors, and a capacitor. The transistors generate a driving current based on signals provided through signal lines, and the light emitting element emits light based on the driving current.

Meanwhile, characteristics of a driving transistor included in each pixel may change when driven for a long time. When characteristics of the driving transistor are changed, after-images may occur and luminance uniformity may deteriorate.

SUMMARY

An aspect of the present disclosure is to provide a display device capable of improving luminance uniformity, a method of driving the display device, and an electronic device including the display device.

A display device in accordance with embodiments of the present disclosure includes: pixels connected to scan lines, data lines, a first power line, a second power line, and a third power line, where each of the pixels includes a light emitting device and a driving transistor for controlling an amount of current supplied to the light emitting device; and a timing controller for generating output data by using input data, where the pixels are configured to emit light in response to a data signal corresponding to the output data during a normal driving period, and receive a bias voltage during a recovery driving period in which the pixels do not emit light after the normal driving period, and the timing controller is configured to control a length of the recovery driving period in response to the input data.

In accordance with an embodiment, the timing controller may be configured to control the length of the recovery driving period by using at least one of a brightness value of the pixels displayed in the normal driving period, a pattern information value of an image displayed in the pixels, and a driving time of the pixels.

In accordance with an embodiment, the recovery driving period may include at least one of an on-bias period in which an on-bias voltage is applied to the driving transistor and a first off-bias period and a second off-bias period in which an off-bias voltage is applied to the driving transistor.

In accordance with an embodiment, the timing controller may be configured to include at least one of the on-bias period, the first off-bias period, and the second off-bias period in the recovery driving period in response to at least one of the brightness value, the pattern information value, and the driving time.

In accordance with an embodiment, the timing controller may be configured to control a length of the on-bias period, a length of the first off-bias period, and a length of the second off-bias period in response to at least one of the brightness value, the pattern information value, and the driving time.

In accordance with an embodiment, the display device may further include a power supply configured to supply a voltage of an operating power to the second power line so as to receive a driving current supplied from the pixels during the normal driving period and the recovery driving period.

In accordance with an embodiment, the power supply may be configured to supply to the first power line, a first driving power having a voltage higher than the operating power and supply, to the third power line, a first initialization power having a voltage lower than a data signal supplied to the data lines during the normal driving period.

In accordance with an embodiment, the power supply may be configured to supply the first driving power to the first power line and supply, to the third power line, a second initialization power having a voltage lower than the first initialization power during the on-bias period.

In accordance with an embodiment, the display device may further include: a data driver for driving the data line; and a scan driver for driving the scan lines.

In accordance with an embodiment, the power supply may be configured to supply, to the first power line, a second driving power having a voltage lower than the first driving power and supply the first initialization power to the third power line during the first off-bias period, and the data driver may be configured to supply, to the data lines, a voltage of a first data signal having a voltage higher than the second driving power during the first off-bias period.

In accordance with an embodiment, the first data signal may be a black data signal.

In accordance with an embodiment, the power supply may be configured to supply the first driving power to the first power line and supply, to the third power line, a third initialization power having a voltage higher than the first initialization power during the second off-bias period, and the data driver may be configured to supply, to the data lines, a voltage of a second data signal having a voltage lower than the third driving power during the second off-bias period.

In accordance with an embodiment, the timing controller may include: a determination unit for determining the brightness value, the pattern information value, and the driving time by using the input data; and a control unit for controlling the length of the recovery driving period, the length of the on-bias period, the length of the first off-bias period, and the length of the second off-bias period by using the brightness value, the pattern information value, and the driving time.

In accordance with an embodiment, the display device may further include an infrared sensor overlapping at least some of the pixels.

In accordance with an embodiment, the timing controller may include: a determination unit for generating the brightness value and the pattern information value by using the input data and determining the driving time by using an operating time of the infrared sensor; and a control unit for controlling the length of the recovery driving period, the length of the on-bias period, the length of the first off-bias period, and the length of the second off-bias period by using the brightness value, the pattern information value, and the driving time.

In accordance with an embodiment, the display device may further include an illumination sensor for measuring brightness of the pixels, and the timing controller may be configured to generate the brightness value by using the illumination sensor.

A display device in accordance with embodiments of the present disclosure includes: pixels connected to scan lines, data lines, a first power line, a second power line, and a third power line, where each of the pixels includes a light emitting device and a driving transistor for controlling an amount of current supplied to the light emitting device; and a timing controller for generating output data by using input data, where the pixels are configured to emit light in response to a data signal corresponding to the output data during a normal driving period, and receive a bias voltage during a recovery driving period in which the pixels do not emit light after the normal driving period, the recovery driving period includes at least one of an on-bias voltage application period and an off-bias voltage application period, and the timing controller is configured to control a length of the on-bias voltage application period and a length of the off-bias voltage application period in response to the input data.

In accordance with an embodiment, the timing controller may be configured to control the length of the on-bias voltage application period and the length of the off-bias voltage application period by using at least one of a brightness value of the pixels displayed in the normal driving period, a pattern information value of an image displayed by the pixels, and a driving time of the pixels.

A method of driving a display device in accordance with embodiments of the present disclosure includes: displaying a certain image in pixels of the display device corresponding to input data during a normal driving period; applying at least one of an on-bias voltage and an off-bias voltage to a driving transistor included in each of the pixels during a recovery driving period in which the pixels do not emit light, where at least one of a length of the recovery driving period, a length of a period in which the on-bias voltage is applied, and a length of a period in which the off-bias voltage is applied is changed in response to at least one of a driving time of the normal driving period, brightness information of the pixels during the normal driving period, and pattern information of an image displayed by the pixels during the normal driving period.

An electronic device in accordance with an embodiment of the present disclosure includes: a display panel including pixels configured to display a certain image during a normal driving period; an illumination sensor configured to measure luminance of the display panel and generate a brightness value of the pixels displayed in the normal driving period; and a controller configured to apply at least one of an on-bias voltage and an off-bias voltage to a driving transistor included in each of the pixels during a recovery driving period in response to the brightness value, where a length of a period in which the on-bias voltage is applied and a length of a period in which the off-bias voltage is applied are changed in response to the brightness value.

The aspects of the present disclosure are not limited to those described above, and other aspects that are not mentioned herein will be clearly understood from the following description by those of ordinary skill in the art.

BRIEF DESCRIPTION OF THE DRAWINGS

FIG. 14 is a table illustrating afterimage characteristics corresponding to a voltage of a second initialization power supplied during an on-bias period.

FIG. 15 is a table illustrating afterimage characteristics corresponding to a first off-bias period and a second off-bias period.

DETAILED DESCRIPTION

Figure 1:
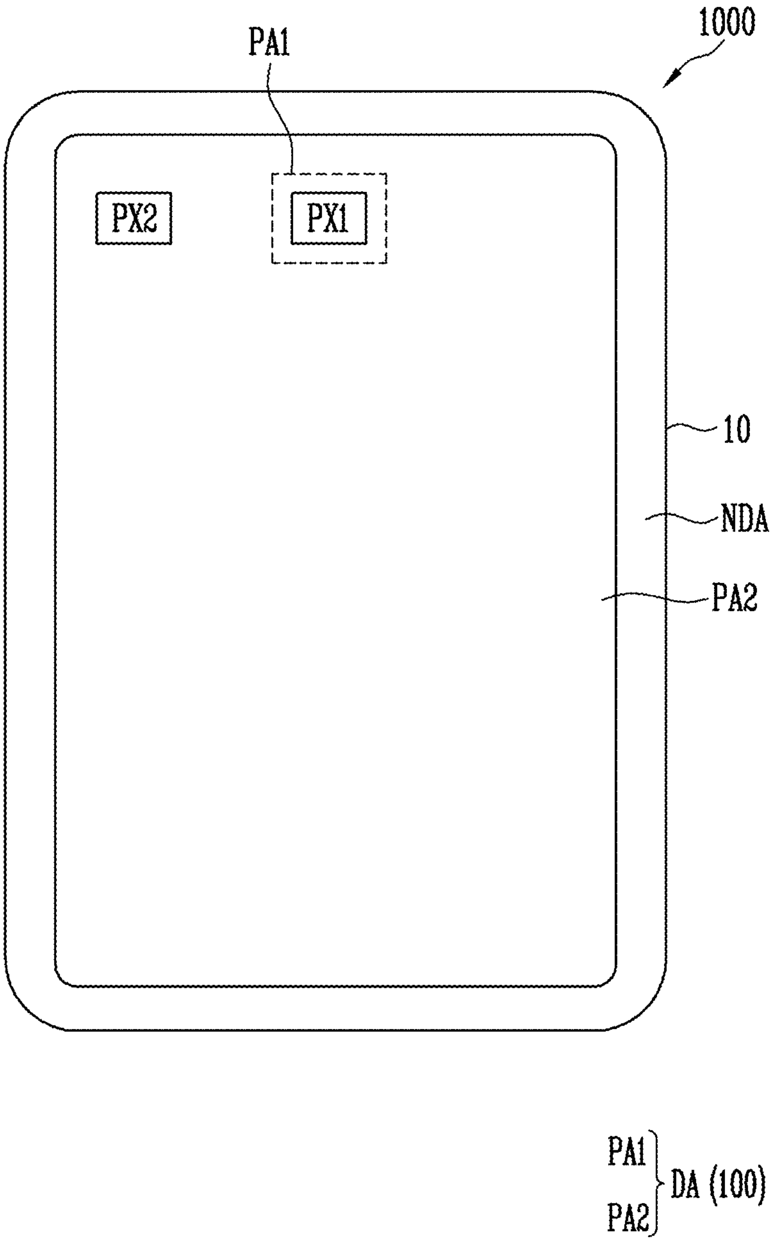
FIG. 1 is a diagram illustrating a display device in accordance with an embodiment of the present disclosure.

Hereinafter, embodiments of the present disclosure will be described in detail with reference to the attached drawings, such that those skilled in the art can easily implement the present disclosure. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those of ordinary skill in the art. The other expressions may also be expressions from which "substantially" has been omitted.

Some embodiments are described with reference to the accompanying drawings in relation to functional blocks, units, and/or modules. Those of ordinary skill in the art will understand that these blocks, units, and/or modules are physically implemented by logic circuits, discrete components, microprocessors, hard-wired circuits, memory elements, wiring connections, and other electronic circuitry. This may be formed by using semiconductor-based manufacturing technologies or other manufacturing technologies. The blocks, units, and/or modules implemented by a microprocessor or other similar hardware may be programmed and controlled by using software to perform various functions discussed herein, and may optionally be driven by firmware and/or software. In addition, the respective blocks, units, and/or modules may be implemented by dedicated hardware, or may be implemented as a combination of dedicated hardware that performs some functions and a processor (e.g., one or more programmed microprocessors and associated circuits) that performs other functions. In addition, in some embodiments, the blocks, units, and/or modules may be physically separated into two or more individual blocks, units, and/or modules that interact within the scope of the present disclosure. In addition, in some embodiments, the blocks, units, and/or modules may be physically combined into more complex blocks, units, and/or modules without departing from the scope of the present disclosure.

The term "connection" between two components may mean using both electrical and physical connections, but is not necessarily limited thereto. For example, the term "connection" used based on a circuit diagram may mean an electrical connection, and the term "connection" used based on a cross-sectional view and a plan view may mean a physical connection.

It will be understood that although "first," "second," etc. may be used herein to describe various elements, these elements should not be limited by these terms. These terms are only used to distinguish one element from another. Therefore, it is apparent that a first element described below may be a second element within the spirit of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Meanwhile, the present disclosure is not limited to embodiments disclosed below, and may be modified and implemented in various forms. In addition, each embodiment disclosed below may be performed alone or in combination with at least one other embodiment.

FIG. 1 is a diagram illustrating a display device in accordance with an embodiment of the present disclosure.

Figure 2:
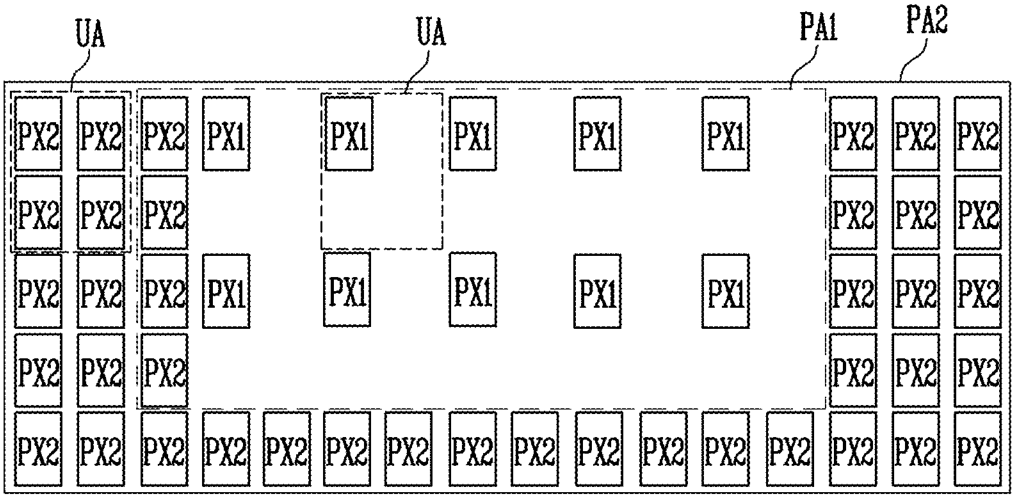
FIG. 2 is a diagram illustrating an embodiment of a portion of a pixel unit of the display device of FIG. 1.

FIG. 2 is a diagram illustrating an embodiment of a portion of a pixel unit of the display device of FIG. 1.

Referring to FIGS. 1 and 2, a display device 1000 may include a display panel 10 including a pixel unit 100.

The display panel 10 may include a display area DA and a non-display area NDA. Pixels PX1 and PX2 may be disposed in the display area DA, and various driving units for driving the pixels PX1 and PX2 may be disposed in the non-display area NDA.

The display area DA may correspond to the pixel unit 100 including the plurality of pixels PX1 and PX2. The pixel unit 100 may include a first pixel area PA1 and a second pixel area PA2. The first pixels PX1 may be disposed in the first pixel area PA1, and the second pixels PX2 may be disposed in the second pixel area PA2.

In an embodiment, a size of a driving transistor included in the first pixel PX1 (e.g., a ratio of channel width to channel length, etc.) may be different from a size of a driving transistor (e.g., M1 in FIG. 5) included in the second pixel PX2 (e.g., a ratio of channel width to channel length, etc.).

In an embodiment, as illustrated in FIG. 2, the number (density) of first pixels PX1 disposed per unit area UA may be less than the number (density) of second pixels PX2. In an embodiment, for example, one first pixel PX1 may be disposed per unit area UA, and four second pixels PX2 may be disposed per unit area UA. Accordingly, the resolution of the first pixel area PA1 may be lower than the resolution of the second pixel area PA2.

Since the aperture ratio of the first pixel area PA1 is higher than the aperture ratio of the second pixel area PA2, a camera, an infrared sensor, etc. can be disposed to overlap the first pixel area PA1. The infrared sensor may include a biometric sensor such as a fingerprint sensor, an iris recognition sensor, and an artery sensor. However, this is only an example, and the infrared detection type sensor may include a gesture sensor, a motion sensor, a proximity sensor, an illumination sensor, and an image sensor.

Meanwhile, the first pixel PX1 located in the first pixel area PA1 may receive infrared light. In this case, the characteristics of the driving transistor included in the first pixel PX1 may be changed by infrared light, and in this case, non-uniform luminance (or afterimage) may be displayed in the first pixel area PA1 rather than the second pixel area PA2.

Figure 3:
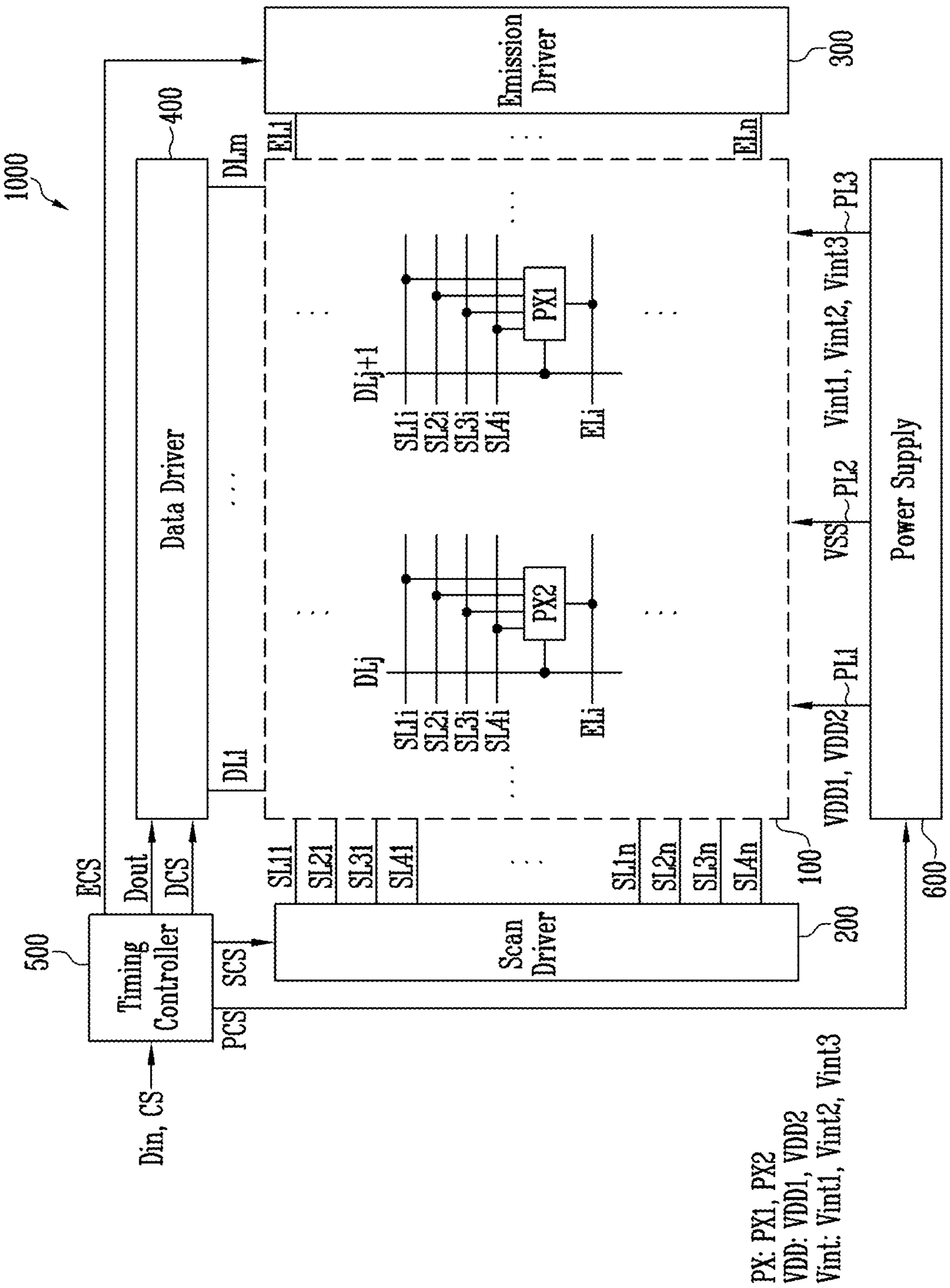
FIG. 3 is a diagram illustrating a display device in accordance with an embodiment of the present disclosure.

FIG. 3 is a diagram illustrating a display device in accordance with an embodiment of the present disclosure.

Referring to FIG. 3, the display device 1000 in accordance with an embodiment of the present disclosure may include a pixel unit 100, a scan driver 200, an emission driver 300, a data driver 400, a timing controller 500, and a power supply 600.

The pixel unit 100 may include scan lines SL11 to SL1n, SL21 to SL2n, SL31 to SL3n, and SL41 to SL4n, emission control lines EL1 to ELn, and data lines DL1 to DLm (where n and m are natural numbers). The pixels PX may each include a driving transistor and a plurality of switching transistors.

In an embodiment, the pixel unit 100 may include the first pixel area PA1 and the second pixel area PA2 described with reference to FIGS. 1 and 2. The first pixel area PA1 may include the first pixels PX1, and the second pixel area PA2 may include the second pixels PX2. The first pixels PX1 and the second pixels PX2 may have substantially the same structure.

The timing controller 500 may receive input data Din and a control signal CS from a host system, such as an application processor ("AP"), through a predetermined interface. The timing controller 500 may generate a first control signal SCS, a second control signal ECS, a third control signal DCS, and a fourth control signal PCS in response to the control signal CS. The first control signal SCS may be supplied to the scan driver 200, the second control signal ECS may be supplied to the emission driver 300, the third control signal DCS may be supplied to the data driver 400, and the fourth control signal PCS may be supplied to the power supply 600. In addition, the timing controller 500 may generate output data Dout by rearranging and/or correcting the input data Din supplied from the outside, and may supply the output data Dout to the data driver 400.

The scan driver 200 may receive the first control signal SCS from the timing controller 500, and may supply a first scan signal, a second scan signal, a third scan signal, and a fourth scan signal to the first scan lines SL11 to SL1n, the second scan lines SL21 to SL2n, the third scan lines SL31 to SL3n, and the fourth scan lines SL41 to SL4n, respectively, based on the first control signal SCS. The second scan lines SL21 to SL2n may be set to the same scan lines as the first scan lines SL11 to SL1n, and the fourth scan lines SL41 to SL4n may be set to the same scan lines as the third scan lines SL31 to SL3n. In addition, the four scan lines SL41 to SL4n may be set to the same scan lines as the first scan lines SL11 to SL1n.

The first to fourth scan signals may be set to gate-on voltages corresponding to the types of transistors to which the corresponding scan signals are supplied. The transistor receiving the scan signal may be set to a turn-on state when the scan signal is supplied. In an embodiment, for example, a gate-on voltage of a scan signal supplied to a P-channel metal oxide semiconductor ("PMOS") transistor may be a logic low level, and a gate-on voltage of a scan signal supplied to an N-channel metal oxide semiconductor ("NMOS") transistor may be a logic high level. Hereinafter, the phrase "a scan signal is supplied" may be understood to mean that a scan signal is supplied at a logic level that turns on a transistor controlled thereby.

In addition, when the first scan signal, the second scan signal, the third scan signal, and the fourth scan signal are not supplied, the scan driver 200 may supply a gate-off voltage to the first scan lines SL11 to SL1n, the second scan lines SL21 to SL2n, the third scan lines SL31 to SL3n, and the fourth scan lines SL41 to SL4n. The gate-off voltage may be set to a voltage at which transistors connected to the first scan lines SL11 to SL1n, the second scan lines SL21 to SL2n, the third scan lines SL31 to SL3n, and the fourth scan lines SL41 to SL4n are turned off.

The emission driver 300 may receive the second control signal ECS from the timing controller 500 and may supply the emission control signal to the emission control lines EL1 to ELn based on the second control signal ECS. In an embodiment, for example, the emission driver 300 may sequentially supply the emission control signals to the emission control lines EL1 to ELn. The emission control signal may be set to a gate-off voltage corresponding to the type of transistor to which the emission control signal is supplied. The transistor receiving the emission control signal may be set to a turn-off state when the emission control signal is supplied. Hereinafter, the phrase "an emission control signal is supplied" may be understood to mean that an emission control signal is supplied at a logic level that turns off a transistor controlled thereby.

Although FIG. 3 illustrates that the scan driver 200 has a single configuration for convenience of explanation, but the embodiment of the present disclosure is not limited thereto. According to a design, the scan driver 200 may include a plurality of scan drivers each supplying at least one of the first to fourth scan signals. In addition, at least a part of the scan driver 200 and the emission driver 300 may be integrated into a single driving circuit, module, or the like.

The data driver 400 may receive the third control signal DCS and the output data Dout from the timing controller 500. The data driver 400 may convert digital output data Dout into an analog data signal (or data voltage) in response to the control of the data control signal DCS. The data driver 400 may supply the data signal to the data lines DL1 to DLm in response to the third control signal DCS. In an embodiment, for example, the data driver 400 may supply the data signal to the data lines DL1 to DLm in synchronization with the first scan signal supplied to the first scan lines SL1n in SL11.

The power supply 600 may receive the fourth control signal PCS from the timing controller 500, and may generate a driving power VDD, an operating power VSS, and an initialization power Vint in response to the fourth control signal PCS.

The driving power VDD may be supplied to the pixels PX via the first power line PL1. The operating power VSS may be supplied to the pixels PX via the second power line PL2. The driving power VDD may be a power that supplies a driving current to the pixels PX, and the operating power VSS may be a power that a driving current is supplied from the pixels PX. To this end, the driving power VDD may be set to a voltage higher than the operating power VSS during the normal driving period in which the pixel unit 100 emits light.

The initialization power Vint may be supplied to the pixels PX via the third power line PL3. The initialization power Vint may be supplied to a gate electrode of the driving transistor included in each pixel PX. This initialization power Vint may be set to a voltage lower than the data signal during the normal driving period.

In an embodiment, the pixels PX may be commonly connected to the first power line PL1, the second power line PL2, and the third power line PL3, but the embodiment of the present disclosure is not limited thereto. In another embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. In an embodiment, the third power line PL3 may include a plurality of power lines, and the plurality of power lines may be connected to different pixels PX. That is, in the embodiment of the present disclosure, the pixels PX may be connected to one of the first power lines PL1, the second power lines PL2, and the third power lines PL3.

In an embodiment of the present disclosure, the display device 1000 may be separately driven in a normal driving period and a recovery driving period in response to the control of the timing controller 500. The normal driving period may refer to a period in which an image is displayed in the pixel unit 100. The recovery driving period may be a period in which a bias voltage is applied to the driving transistor included in each of the pixels PX after the pixels PX included in the pixel unit 100 are turned off. The recovery driving period may include at least one of an on-bias period, a first off-bias period, and a second off-bias period.

During the normal driving period and the recovery driving period, the power supply 600 supplies the voltage of the operating power VSS to the second power line PL2. That is, the voltage of the operating power VSS may be maintained at the same voltage during the normal driving period and the recovery driving period.

During the normal driving period, the on-bias period, and the second off-bias period, the power supply 600 may supply the first driving power VDD1 through the first power line PL1 and may supply the voltage of the second driving power VDD2 during the first off-bias period. Here, the second driving power VDD2 may be set to a voltage lower than the first driving power VDD1.

During the normal driving period and the first off-bias period, the power supply 600 may supply the first initialization power Vint1 to the third power line PL3, may supply the second initialization power Vint2 (i.e., on-bias voltage) during the on-bias period, and may supply the third initialization power Vint3 (i.e., off-bias voltage) during the second off-bias period. Here, the second initialization power Vint2 may be set to a voltage lower than the first initialization power Vint1, and the third initialization power Vint3 may be set to a voltage higher than the first initialization power Vint1.

In an embodiment, the timing controller 500 may control the length (or time, width, area, etc.) of the recovery driving period (or bias period) in response to the brightness of the pixel unit 100 detected by the input data Din, the pattern of the image, and/or the driving time of the display device 1000 (or pixels). Here, controlling the length of the recovery driving period may mean that the time at which the bias voltage is applied to the driving transistor included in each of the pixels PX is changed.

In addition, the timing controller 500 may control the length of the on-bias period, the length of the first off-bias period, and/or the length of the second off-bias period included in the recovery driving period in response to the brightness of the pixel unit 100, the pattern of the image, and/or the driving time of the display device 1000.

In an embodiment, for example, when the pixel unit 100 emits light with a high luminance higher than a first threshold, the timing controller 500 may control the recovery driving period to include only the on-bias period or may control the on-bias period to increase. In addition, when the pixel unit 100 emits light with low luminance below a second threshold, the timing controller 500 may control the recovery driving period to include only the first off-bias period or the second off-bias period, or may control the first off-bias period and/or the second off-bias period to increase.

Figure 4:
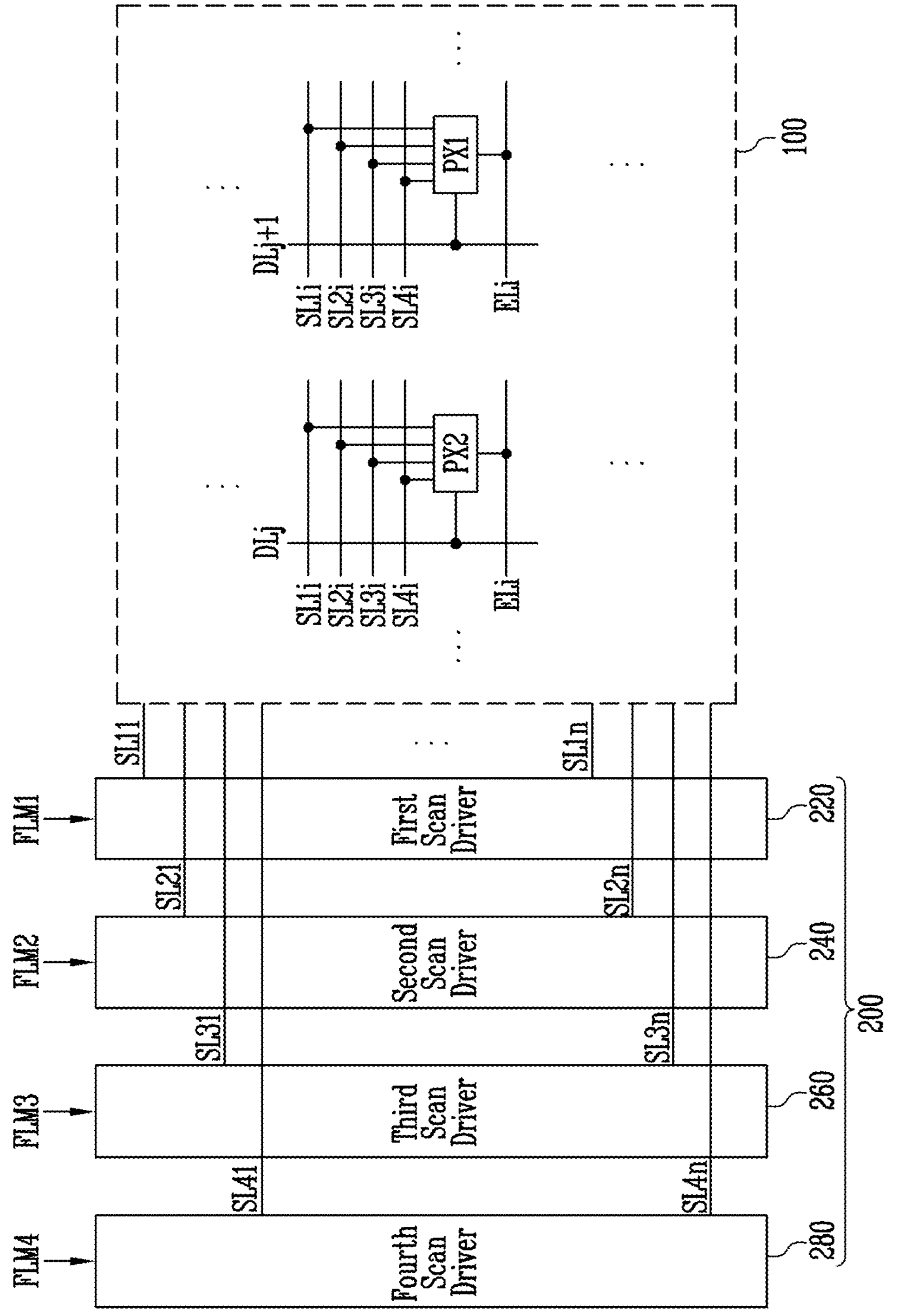
FIG. 4 is a diagram illustrating an embodiment of a scan driver included in the display device of FIG. 3.

FIG. 4 is a diagram illustrating an embodiment of the scan driver included in the display device of FIG. 3.

Referring to FIG. 4, the scan driver 200 in accordance with an embodiment of the present disclosure may include a first scan driver 220, a second scan driver 240, a third scan driver 260, and a fourth scan driver 280.

The first control signal SCS may include first to fourth scan start signals FLM1 to FLM4. The first to fourth scan start signals FLM1 to FLM4 may be supplied to the first to fourth scan drivers 220 to 280, respectively. The width and supply timing of the first to fourth scan start signals FLM1 to FLM4 may be determined according to the driving conditions and frame frequency of the pixel PX.

The first scan driver 220 may sequentially supply the first scan signal to the first scan lines SL11 to SL1n in response to the first scan start signal FLM1. The second scan driver 240 may sequentially supply the second scan signal to the second scan lines SL21 to SL2n in response to the second scan start signal FLM2. The third scan driver 260 may sequentially supply the third scan signal to the third scan lines SL31 to SL3n in response to the third scan start signal FLM3. The fourth scan driver 280 may sequentially supply the fourth scan signal to the fourth scan lines SL41 to SL4n in response to the fourth scan start signal FLM4.

Figure 5:
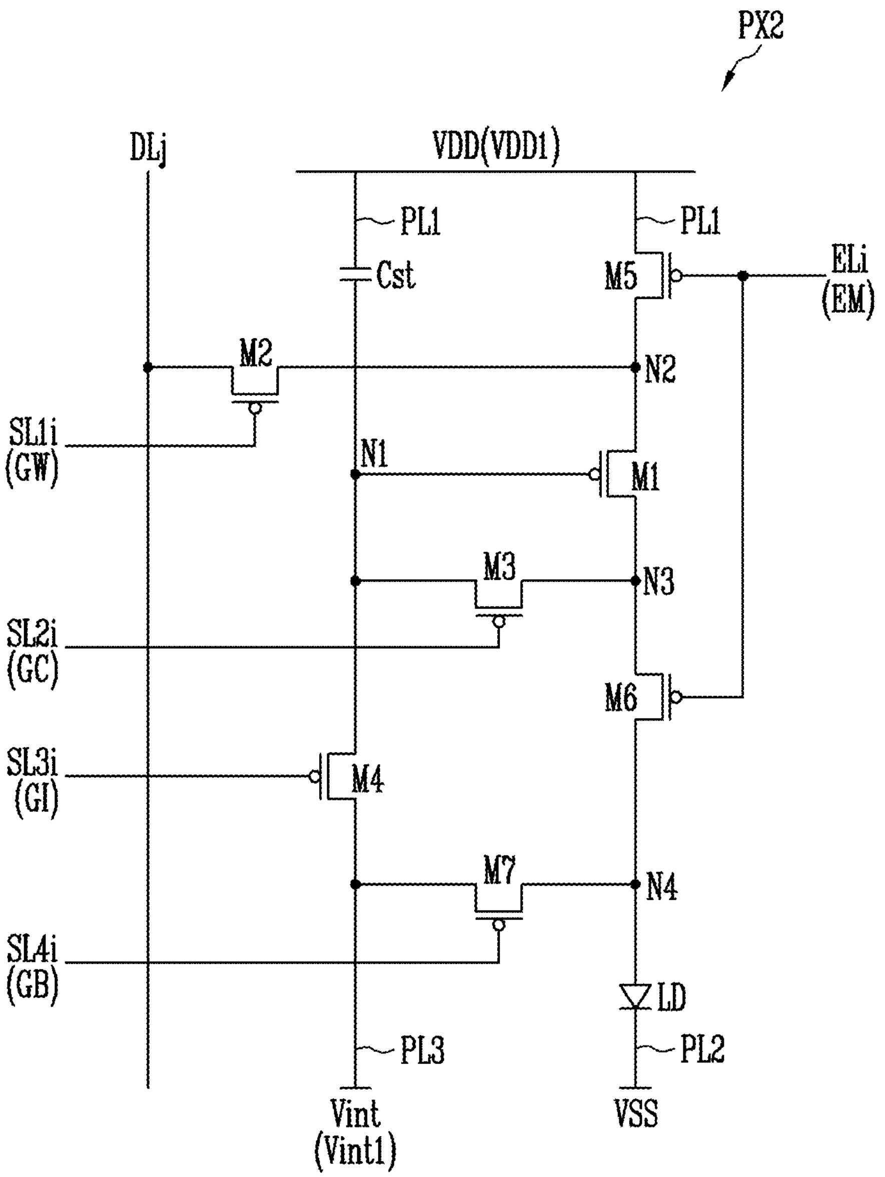
FIG. 5 is a diagram illustrating a second pixel in accordance with an embodiment of the present disclosure.

FIG. 5 is a diagram illustrating a second pixel in accordance with an embodiment of the present disclosure. For convenience of explanation, FIG. 5 illustrates that a second pixel PX2 is located on a horizontal line (or an i-th pixel row) and connected to a j-th data line DLj (where i and j are natural numbers). The first pixel PX1 has substantially the same structure as the second pixel PX2, and thus, a separate description thereof is omitted.

Referring to FIG. 5, the second pixel PX2 in accordance with an embodiment of the present disclosure includes a light emitting device LD and a pixel circuit for controlling the amount of current supplied to the light emitting device LD.

A first electrode (or an anode electrode) of the light emitting device LD may be connected to a first power line PL1 to which a driving power VDD is supplied via a sixth transistor M6, a first transistor M1, and a fifth transistor M5, and a second electrode (or a cathode electrode) of the light emitting device LD may be connected to a second power line PL2 to which an operating power VSS is supplied. The light emitting device LD may generate light with a certain luminance in response to the amount of current supplied from the first transistor M1 (or the driving transistor).

The light emitting device LD may be selected as an organic light emitting diode. Additionally, the light emitting device LD may be selected as an inorganic light emitting diode, such as a micro light emitting diode ("LED") or a quantum dot LED. In addition, the light emitting device LD may be a device including a composite of organic and inorganic materials. FIG. 5 illustrates that the pixel PX includes a single light emitting device LD, but in another embodiment, the pixel PX may include a plurality of light-emitting devices, and the plurality of light-emitting devices may be connected to each other in series, parallel, or series-parallel.

The pixel circuit may include first to seventh transistors M1 to M7 and a storage capacitor Cst.

A first electrode of the first transistor M1 (or the driving transistor) may be connected to a second node N2, and s second electrode of the first transistor M1 may be connected to a third node N3. A gate electrode of the first transistor M1 may be connected to the first node N1. The first transistor M1 can control the amount of current supplied from the driving power VDD to the operating power VSS via the light emitting device LD in response to the voltage of the first node N1.

The second transistor M2 may be connected between the data line DLj and the second node N2. In addition, a gate electrode of the second transistor M2 may be connected to the first scan line SL1i. The second transistor M2 may be turned on when the first scan signal GW is supplied to the first scan line SL1i, and may electrically connect the data line DLj to the second node N2.

The third transistor M3 may be connected between the first node N1 and the third node N3. A gate electrode of the third transistor M3 may be connected to the second scan line SL2i. The third transistor M3 may be turned on when the second scan signal GC is supplied to the second scan line SL2i, and may electrically connect the first node N1 to the third node N3. When the third transistor M3 is turned on, the first transistor M1 is diode-connected.

The fourth transistor M4 is connected between the first node N1 and the third power line PL3 to which the initialization power Vint is supplied. A gate electrode of the fourth transistor M4 is connected to the third scan line SL3i. The fourth transistor M4 may be turned on when the third scan signal GI is supplied to the third scan line SL3i, and may supply the voltage of the initialization power Vint to the first node N1. The voltage of the first initialization power Vint1 supplied during the normal driving period may be set to a voltage lower than the data signal supplied to the data line DLj.

The fifth transistor M5 is connected between the second node N2 and the first power line PL1 to which the driving power VDD is supplied. In addition, a gate electrode of the fifth transistor M5 may be connected to the emission control line ELi. The fifth transistor M5 may be turned off when the emission control signal EM is supplied to the emission control line ELi, and may be turned on in other cases.

The sixth transistor M6 is connected between the third node N3 and the fourth node N4. In addition, a gate electrode of the sixth transistor M6 may be connected to the emission control line ELi. The sixth transistor M6 may be turned off when the emission control signal EM is supplied to the emission control line ELi, and may be turned on in other cases. Meanwhile, although FIG. 5 illustrates that the fifth transistor M5 and the sixth transistor M6 are connected to the same emission control line ELi, the present disclosure is not limited thereto. In another embodiment, the fifth transistor M5 and the sixth transistor M6 may be connected to different emission control lines.

The seventh transistor M7 is connected between the fourth node N4 and the third power line PL3 to which the initialization power Vint is supplied. A gate electrode of the seventh transistor M7 may be connected to the fourth scan line SL4i. The seventh transistor M7 may be turned on when the fourth scan signal GB is supplied to the fourth scan line SL4i, and may supply the voltage of the initialization power Vint to the fourth node N4.

The storage capacitor Cst is connected between the first power line PL1 and the first node N1. The storage capacitor Cst may store the voltage applied to the first node N1.

Although FIG. 5 illustrates that the first to seventh transistors M1 to M7 are P-type transistors (e.g., PMOS transistors), the embodiment of the present disclosure is not limited thereto. For another example, at least one transistor among the first to seventh transistors M1 to M7 may be replaced with an N-type transistor (e.g., an NMOS transistor).

Figure 6:
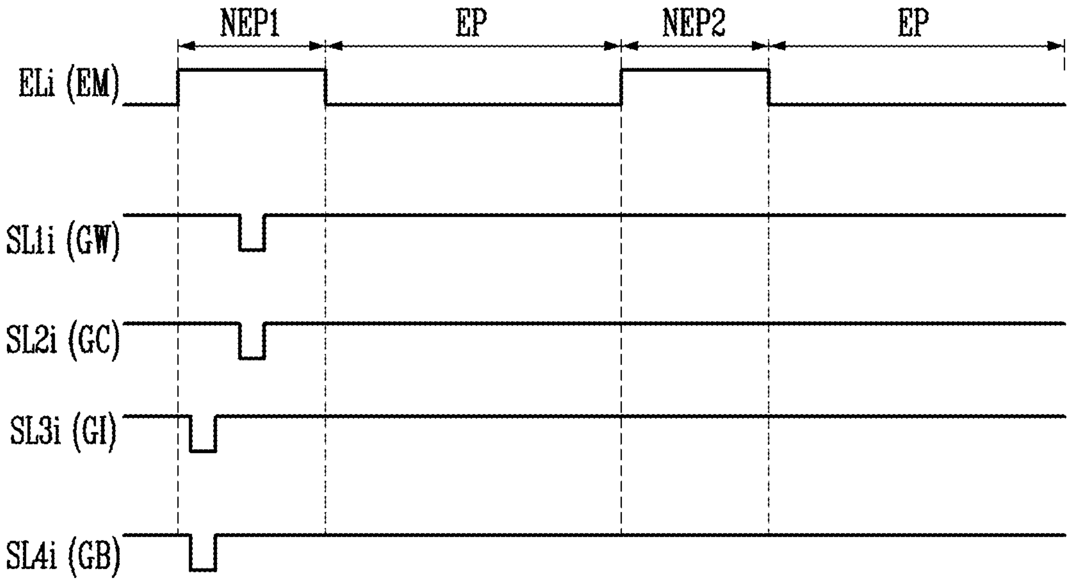
FIGS. 6 and 7 are diagrams illustrating an embodiment of a driving signal supplied to a pixel during a normal driving period.
Figure 7:
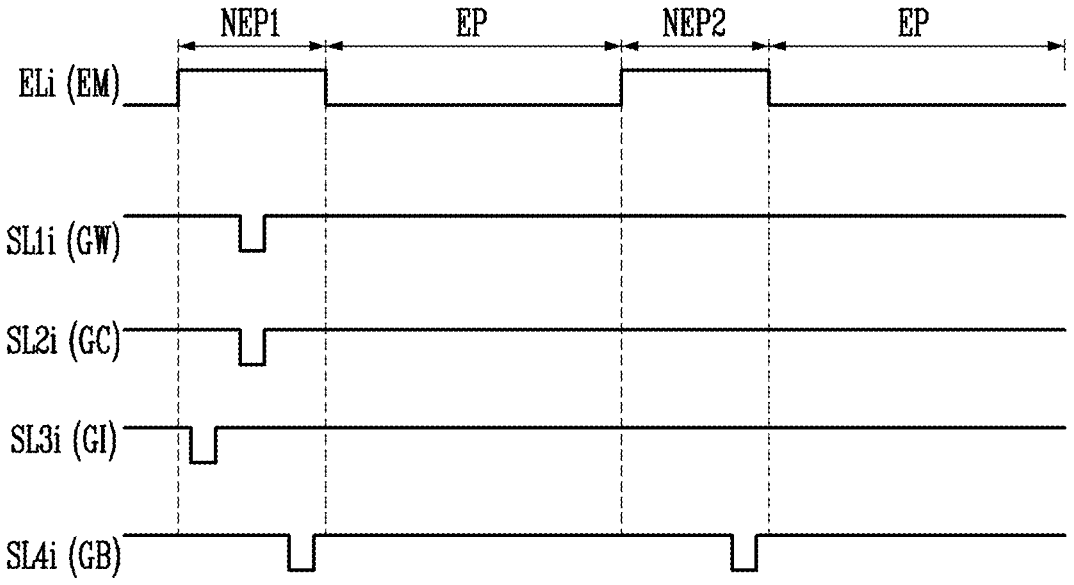

FIGS. 6 and 7 are diagrams illustrating an embodiment of the driving signal supplied to the pixel during the normal driving period. FIGS. 6 and 7 may be one frame period of the normal driving period. During the normal driving period, the power supply 600 may supply the first driving power VDD1 to the first power line PL1, and may supply the voltage of the first initialization power Vint1 to the third power line PL3.

Referring to FIGS. 5 and 6, one frame period may include an emission period EP, a first non-emission period NEP1, and a second non-emission period NEP2. The emission period EP may be adjacent to each of the first non-emission period NEP1 and the second non-emission period NEP2.

Although FIG. 6 illustrates that one frame period includes two non-emission periods NEP1 and NEP2, the present disclosure is not limited thereto. For another example, the number of non-emission periods NEP1 and NEP2 included in one frame period may be variously set according to the frame frequency and/or settings of the display device 1000.

The first non-emission period NEP1 may refer to a period in which a data signal is written. The second non-emission period NEP2 may refer to a period in which a previous data signal is maintained and the pixel PX does not emit light. When a plurality of non-emission periods are included in one frame period, motion blur or the like may be reduced and video quality may be effectively improved accordingly.

The emission control signal EM may be supplied multiple times during one frame period. That is, the emission control signal EM may have an off period corresponding to the first non-emission period NEP1 and the second non-emission period NEP2. The off period of the emission control signal may refer to a period in which the emission control signal is supplied and the fifth transistor M5 and the sixth transistor M6 are turned off accordingly.

An operation process is described. First, the fifth transistor M5 and the sixth transistor M6 are turned off by the emission control signal EM supplied to the emission control line ELi during the first non-emission period NEP1. When the fifth transistor M5 and the sixth transistor M6 are turned off, the electrical connection between the first power line PL1 and the light emitting device LD is cut off, and thus, the light emitting device LD is set to a non-emission state.

Thereafter, the third scan signal GI is supplied to the third scan line SL3i, and the fourth scan signal GB is supplied to the fourth scan line SL4i. When the third scan signal GI is supplied to the third scan line SL3i, the fourth transistor M4 is turned on, and when the fourth scan signal GB is supplied to the fourth scan line SL4i, the seventh transistor M7 is turned on.

When the fourth transistor M4 is turned on, the voltage of the first initialization power Vint1 is supplied to the first node N1. Accordingly, the first node N1 is initialized to the voltage of the first initialization power Vint1. When the seventh transistor M7 is turned on, the voltage of the first initialization power Vint1 is supplied to the first electrode (that is, the fourth node N4) of the light emitting device LD. A parasitic capacitor of the light emitting device LD may be discharged, and thus, the black expression ability may be effectively improved.

Meanwhile, the third scan line SL3i and the fourth scan line SL4i may be set as the same scanning line. The third scan line SL3i and the fourth scan line SL4i may be set as the first scan line SL1i−1 located on the previous horizontal line.

Thereafter, the first scan signal GW is supplied to the first scan line SL1i, and the second scan signal GC is supplied to the second scan line SL2i. When the first scan signal GW is supplied to the first scan line SL1i, the second transistor M2 is turned on. When the second scan signal GC is supplied to the second scan line SL2i, the third transistor M3 is turned on. The second scan signal GC may be set as the same scan signal as the first scan signal GW (that is, the first scan line SL1i and the second scan line SL2i may be set as the same scan line).

When the second transistor M2 is turned on, the data line DLj and the second node N2 are electrically connected to each other, and thus, the data signal from the data line DLj is supplied to the second node N2. When the third transistor M3 is turned on, the first transistor M1 is diode-connected. In this case, the data signal supplied to the second node N2 is supplied to the first node N1 via the diode-connected first transistor M1. Accordingly, the data signal and the voltage corresponding to the threshold voltage of the first transistor M1 may be applied to the first node N1. The storage capacitor Cst stores the voltage applied to the first node N1.

After the data signal and the voltage corresponding to the threshold voltage of the first transistor M1 are stored in the storage capacitor Cst, the supply of the emission control signal EM is stopped. When the supply of the emission control signal EM is stopped, the fifth transistor M5 and the sixth transistor M6 are turned on. When the fifth transistor M5 and the sixth transistor M6 are turned on, the first power line PL1 may be electrically connected to the first electrode of the light emitting device LD via the fifth transistor M5, the first transistor M1, and the sixth transistor M6. At this time, the first transistor M1 supplies, to the light emitting device LD, a driving current corresponding to the voltage applied to the first node N1, and the light emitting device LD emits light with a luminance corresponding to the driving current. That is, the light emitting device LD may emit light with a luminance corresponding to the driving current during the emission period EP after the first non-emission period NEP1.

In the second non-emission period NEP2, the emission control signal EM is supplied to the emission control line ELi, and accordingly, the fifth transistor M5 and the sixth transistor M6 are turned off. When the fifth transistor M5 and the sixth transistor M6 are turned off, the electrical connection between the first power line PL1 and the light emitting device LD is cut off, and thus, the light emitting device LD is set to a non-emission state.

The scan signals GW, GC, GI, and GB are not supplied during the second non-emission period NEP2. Accordingly, the storage capacitor Cst maintains the stored voltage in the first non-emission period NEP1. During the emission period EP subsequent to the second non-emission period NEP2, the supply of the emission control signal EM is stopped, and the fifth transistor M5 and the sixth transistor M6 are turned on. During the emission period EP subsequent to the second non-emission period NEP2, the light emitting device LD may emit light with a luminance corresponding to the driving current.

Meanwhile, in the embodiment of the present disclosure, the supply waveform of the scan signal for driving the pixel PX may be variously changed. In an embodiment, for example, as illustrated in FIG. 7, after the first scan signal GW is supplied to the first scan line SL1i during the first non-emission period NEP1, the fourth scan signal GB may be supplied to the fourth scan line SL4i. The fourth scan signal GB may be supplied to the fourth scan line SL4i during the second non-emission period NEP2.

When the fourth scan signal GB is supplied to the fourth scan line SL4i during the second non-emission period NEP2, the seventh transistor M7 is turned on. Accordingly, the first electrode of the light emitting device LD may be initialized to the voltage of the first initialization power Vint1.

Figure 8:
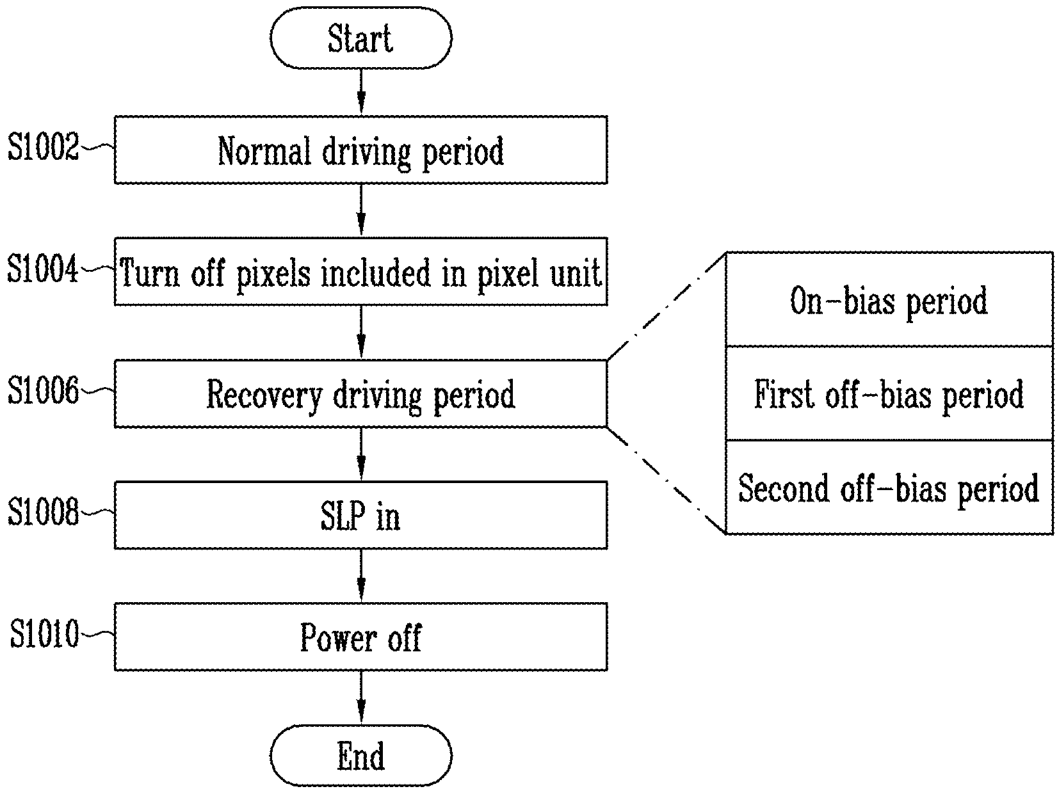
FIG. 8 is a flowchart illustrating a method of driving a display device in accordance with an embodiment of the present disclosure.

FIG. 8 is a flowchart illustrating a method of driving the display device in accordance with an embodiment of the present disclosure.

Referring to FIG. 8, the display device 1000 may be driven in a normal driving manner (i.e., normal driving period) after power is inputted (S1002). During the normal driving period, the pixel unit 100 of the display device 1000 may display a certain image in response to the input data Din.

When input data Din is not input after the certain image is displayed on the display device 1000, the pixels PX included in the pixel unit 100 may be turned off (i.e., does not emit light) (S1004). After the pixels PX are turned off, the display device 1000 may be driven in the recovery driving mode (i.e., recovery driving period) (S1006).

The recovery driving period may be a period in which a bias voltage is applied to the driving transistor (or the first transistor M1) included in each of the pixels PX. When the bias voltage is applied to the driving transistor, the characteristics of the driving transistor may be initialized, and thus, afterimages may be minimized. That is, the uniformity of luminance may be effectively improved by the recovery driving period.

The recovery driving period may include at least one of an on-bias period, a first off-bias period, and a second off-bias period. The "on-bias period" may refer to a period in which the on-bias voltage is applied to the driving transistor included in each of the pixels PX, and the "first off-bias period" and the "second off-bias period" may refer to periods during which the off-bias voltage is applied to the driving transistor included in each of the pixels PX. The on-bias period may refer to as an "on-bias voltage application period", and the "first off-bias period" and the "second off-bias period" may refer to as an "off-bias voltage application period".

The length of the recovery driving period may be controlled by the timing controller 500. In addition, the timing controller 500 may control the length of the on-bias period, the length of the first off-bias period, and the length of the second off-bias period included in the recovery driving period.

After the recovery driving period, the display device 1000 may be set to a sleep-in ("SLP in") state (S1008). The sleep-in (SLP in) state may refer to a state in which circuit components included in the display device 1000 are maintained at minimum power. After the sleep-in (SLP in) state, the display device 1000 may be powered off (S1010). However, the present disclosure is not limited thereto, and when the input data Din is inputted after the sleep-in (SLP in) state, the display device 1000 may be driven in a normal driving manner.

Figure 9A:
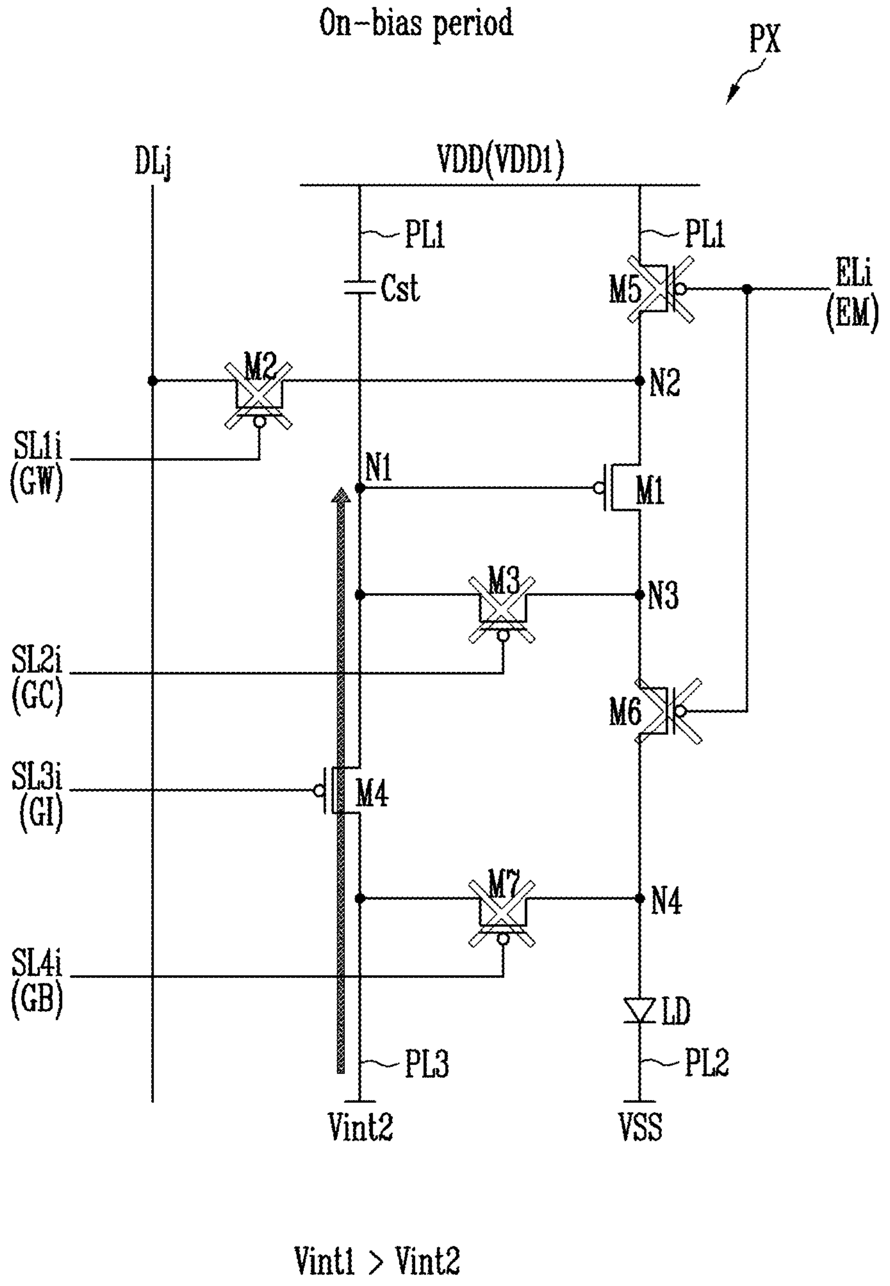
FIGS. 9A and 9B are diagrams illustrating an embodiment of an on-bias period included in a recovery driving period.
Figure 9B:
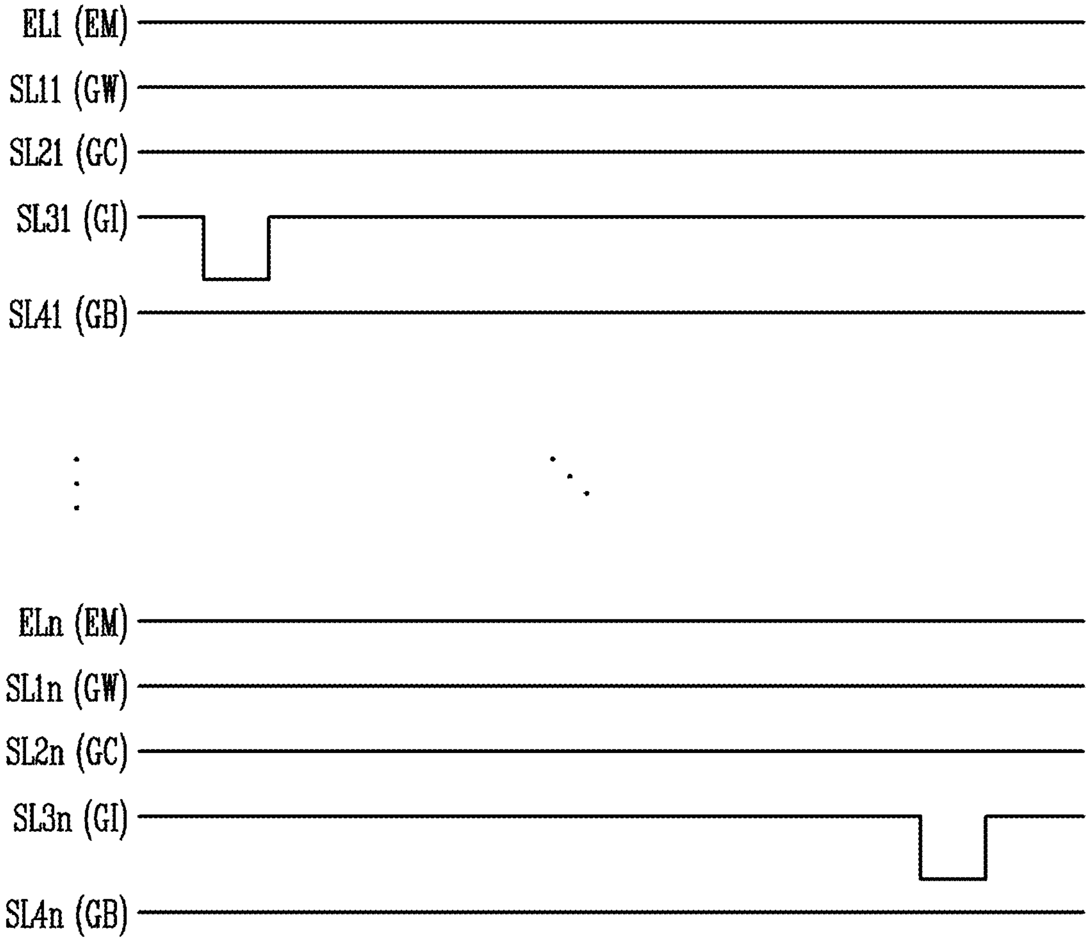

FIGS. 9A and 9B are diagrams illustrating an embodiment of the on-bias period included in the recovery driving period.

Referring to FIGS. 9A and 9B, during the on-bias period, the power supply 600 may supply the voltage of the second initialization power Vint2 to the third power line PL3 under the control of the timing controller 500. The second initialization power Vint2 may be set to a voltage lower than the first initialization power Vint1.

During the on-bias period, in response to the control of the timing controller 500, the scan driver 200 may sequentially supply the third scan signal GI to the third scan lines SL31 to SL3n. When the third scan signal GI is supplied to the third scan line SL3i, the voltage of the second initialization power Vint2 may be supplied to the first node N1 as illustrated in FIG. 9A. When the second initialization power Vint2 is supplied to the first node N1, the first transistor M1 may be set to the on-bias state. That is, during the on-bias period, the voltage of the second node N2 may be set to a voltage similar or identical to the first driving power VDD1. Accordingly, when the second initialization power Vint2 that is a low voltage is supplied to the first node N1, the first transistor M1 may be set to the on-bias state.

When the first transistor M1 is set to the on-bias state, the characteristics of the first transistor M1 may be initialized to the on-bias state. In an embodiment, for example, the characteristics of the first transistors M1 included in each of the pixels PX may be initialized to the on-bias state, and thus, the uniformity of luminance may be effectively improved.

During the on-bias period, the fifth transistor M5 and the sixth transistor M6 are set to a turn-off state, and thus, the light emitting device LD may maintain a non-emission state.

Figure 10:
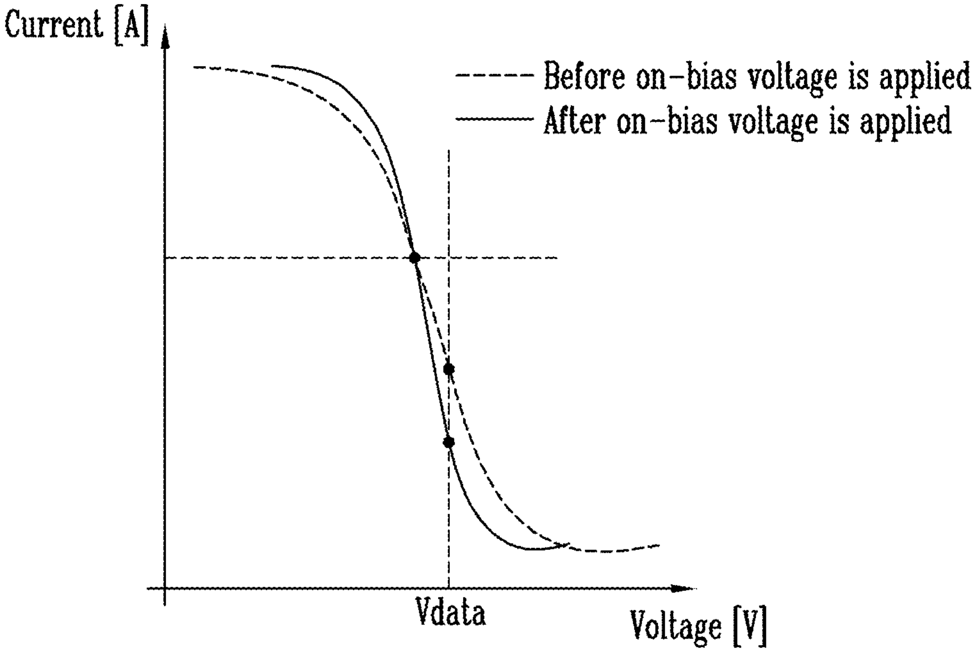
FIG. 10 is a diagram illustrating a change in a characteristic curve of a driving transistor due to an on-bias period.

FIG. 10 is a diagram illustrating a change in characteristic curve of the driving transistor due to the on-bias period. In FIG. 10, the X-axis represents the voltage of the first node N1 (or the voltage of the data signal), and the Y-axis represents the driving current corresponding to the voltage of the first node N1.

Referring to FIG. 10, when an on-bias voltage (i.e., Vint2 in FIG. 9A) is applied to the driving transistor (i.e., the first transistor M1), the characteristics of the driving transistor may be changed so that less driving current flows in response to the voltage Vdata of the same data signal. When the driving transistors included in the pixels PX are set to the on-bias state, the characteristic curve of each driving transistor may become similar or identical, and thus, the uniformity of luminance may be effectively improved.

Figure 11A:
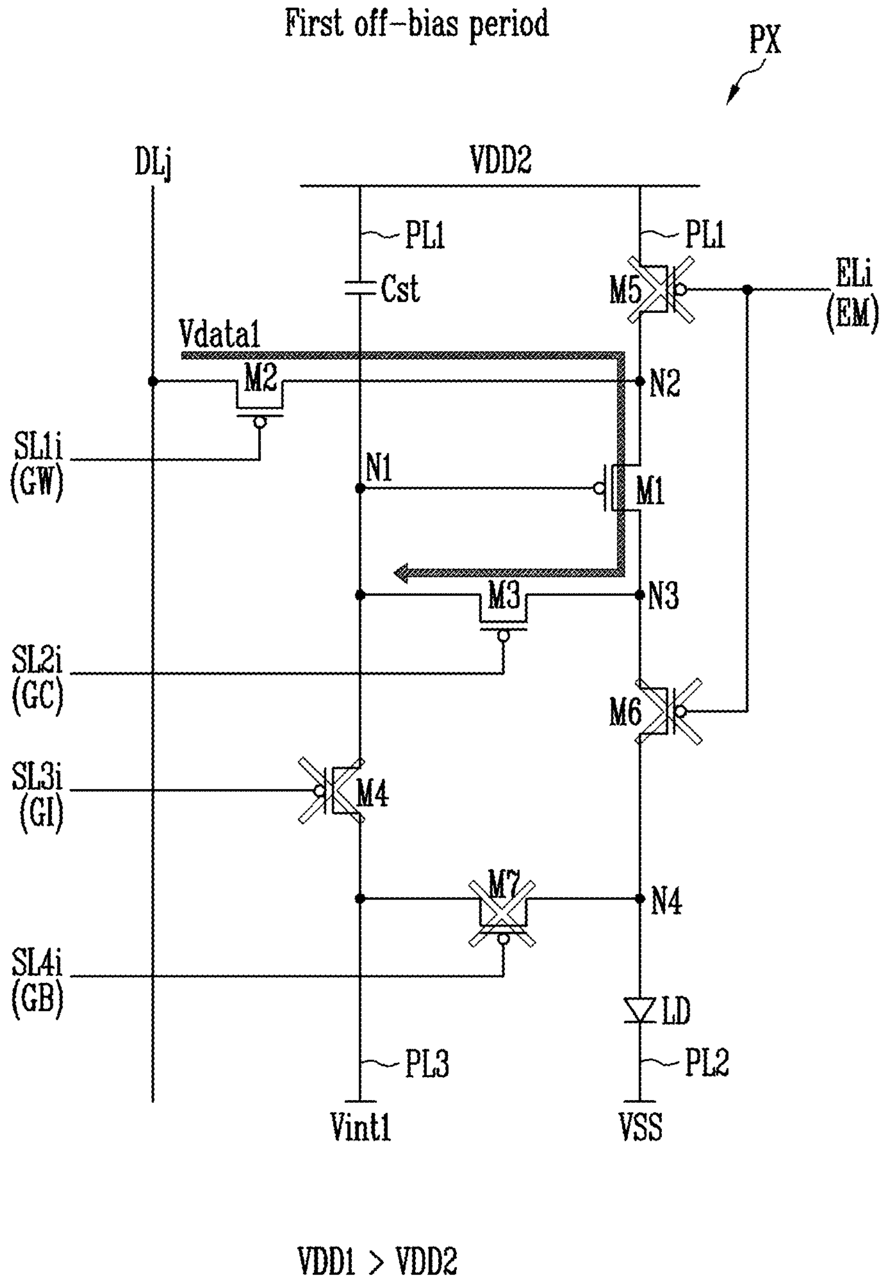
FIGS. 11A, 11B and 11C are diagrams illustrating an embodiment of a first off-bias period included in a recovery driving period.
Figure 11B:
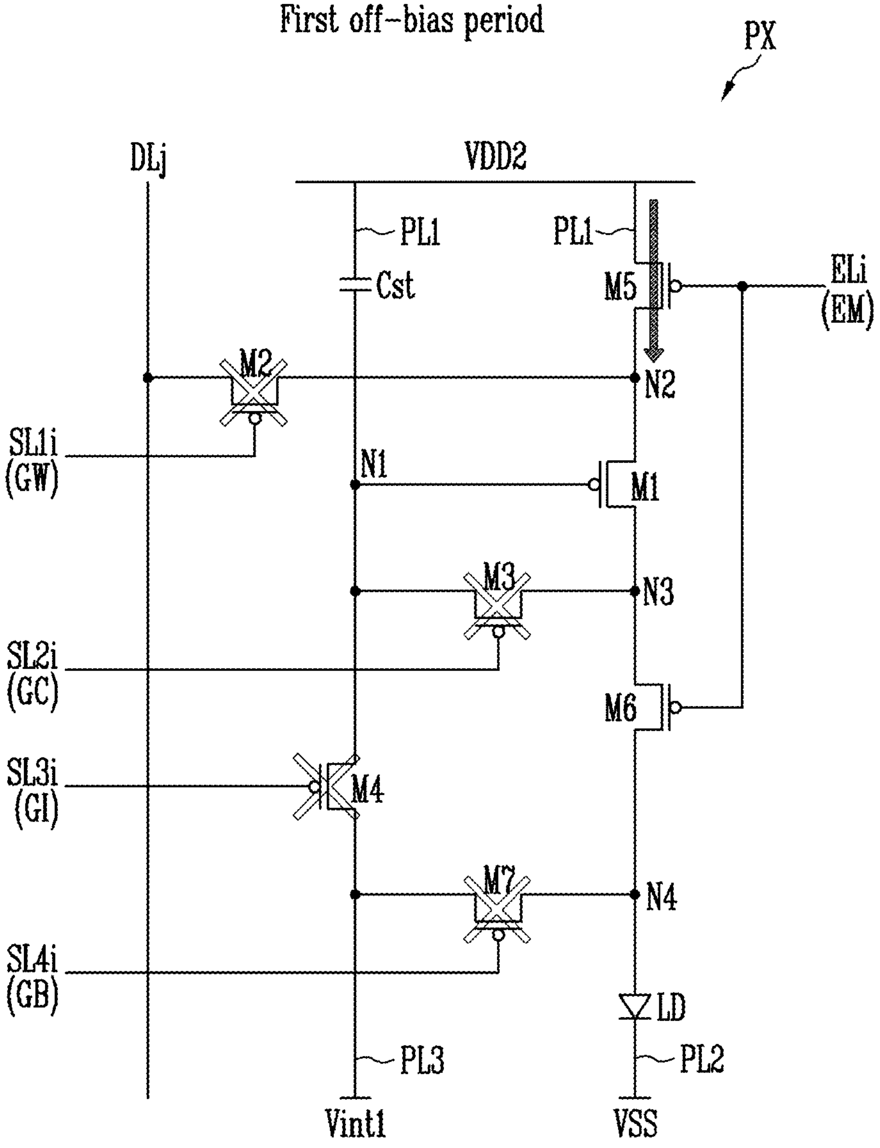
Figure 11C:
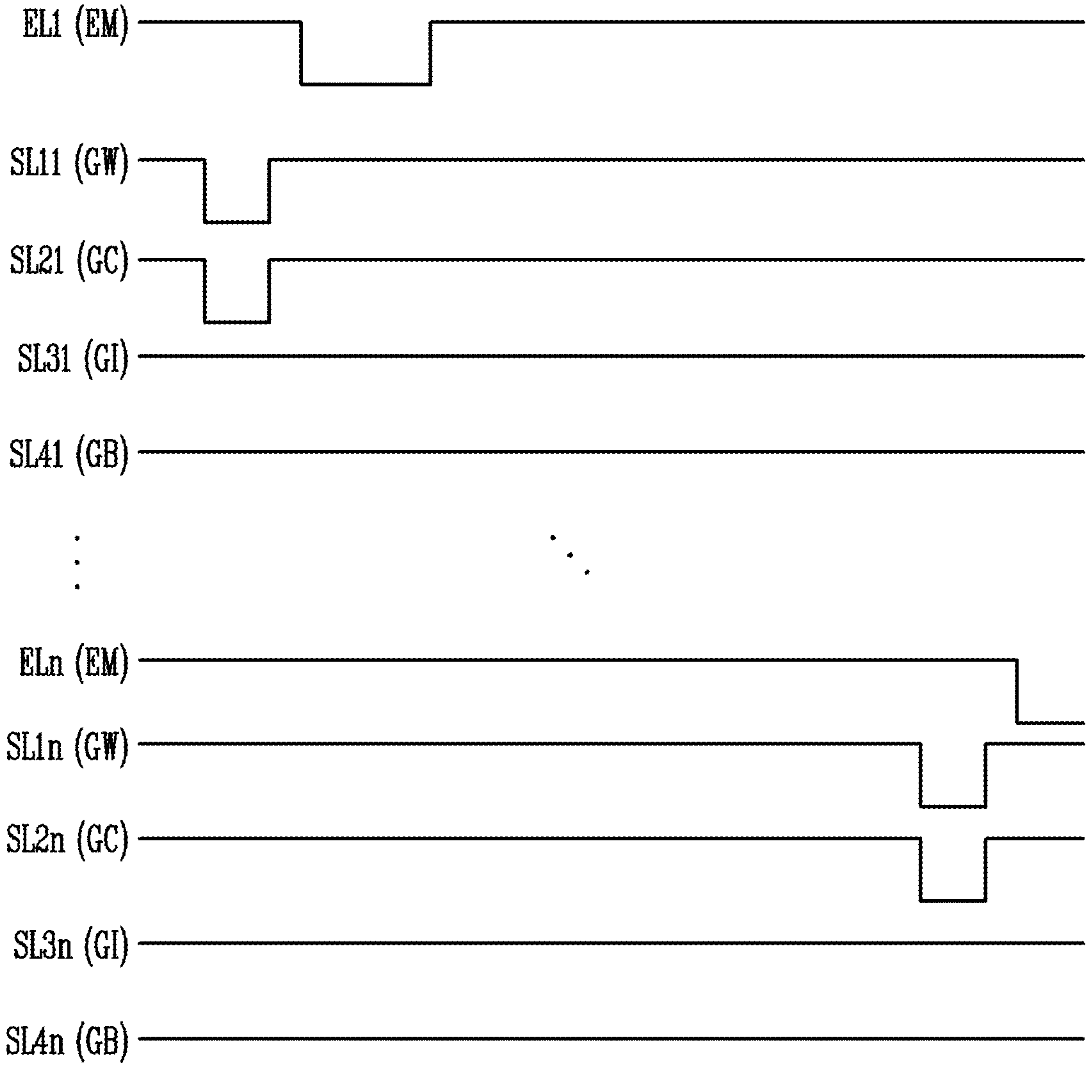

FIGS. 11A to 11C are diagrams illustrating an embodiment of the first off-bias period included in the recovery driving period.

Referring to FIGS. 11A to 11C, during the first off-bias period, the power supply 600 may supply the voltage of the second driving power VDD2 to the first power line PL1 under the control of the timing controller 500. The second driving power VDD2 may be set to a voltage lower than the first driving power VDD1.

During the first off-bias period, the scan driver 200 may sequentially supply the first scan signal GW to the first scan lines SL11 to SL1n and may sequentially supply the second scan signal GC to the second scan lines SL21 to SL2n in response to the control of the timing controller 500. In response to the control of the timing controller 500 during the first off-bias period, the emission driver 300 may sequentially stop supplying the emission control signal supplied to the emission control lines EL1 to ELn (alternatively, the enable emission control signal (gate-on voltage) may be supplied sequentially).

The emission control signal EM supplied to the i-th emission control line ELi may be stopped after the supply of the first scan signal GW to the i-th first scanning line SL1i is stopped. The second scan signal GC supplied to the i-th second scan line SL2i may be supplied to overlap the first scan signal GW supplied to the i-th first scan line SL1i. In an embodiment, for example, the i-th first scan line SL1i and the i-th second scan line SL2i may be the same scan line.

During the first off-bias period, the data driver 400 may supply the voltage Vdata1 of the first data signal to the data lines DL1 to DLm in response to the control of the timing controller 500. Here, the first data signal may be a black data signal.

As illustrated in FIG. 11A, when the first scan signal GW is supplied to the first scan line SL1i, the second transistor M2 is turned on, and when the second scan signal GC is supplied to the second scan line SL2i, the third transistor M3 is turned on. The voltage Vdata1 of the first data signal may be transmitted from the data line DLj to the first node N1. In an embodiment, for example, when the voltage Vdata1 of the first data signal is set to 7.6V and the threshold voltage of the first transistor M1 is set to −3.3V, the voltage of the first node N1 may be set to 4.3V.

After the supply of the first scan signal GW and the second scan signal GC is stopped, the supply of the emission control signal EM to the emission control line ELi may be stopped. Then, as illustrated in FIG. 11B, the fifth transistor M5 and the sixth transistor M6 may be turned on. When the fifth transistor M5 is turned on, the voltage of the second driving power VDD2 may be supplied to the second node N2. Here, the voltage of the second driving power VDD2 may be set to be lower than the voltage Vdata1 of the first data signal. In an embodiment, for example, the second driving power VDD2 may be set to 3V.

In this case, the voltage Vgs of the first transistor M1 is set to 1.3V, and the off-bias voltage may be applied to the first transistor M1. Since the first transistor M1 is set to the turn-off state during the first off-bias period, the light emitting device LD may maintain a non-emission state.

Figure 12:
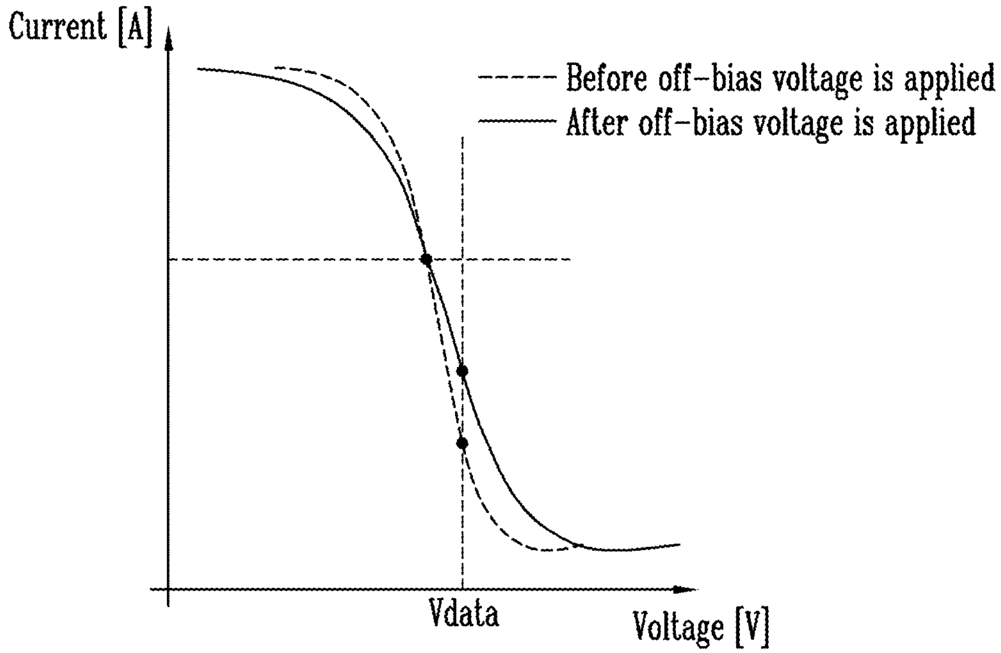
FIG. 12 is a diagram illustrating a change in a characteristic curve of a driving transistor due to a first off-bias period.

FIG. 12 is a diagram illustrating a change in characteristic curve of the driving transistor due to the first off-bias period. In FIG. 10, the X-axis represents the voltage of the first node N1 (or the voltage of the data signal), and the Y-axis represents the driving current corresponding to the voltage of the first node N1.

Referring to FIG. 12, when the off-bias voltage is applied to the driving transistor, the characteristics of the driving transistor may be changed so that more driving current flows in response to the voltage Vdata of the same data signal. When the driving transistors included in the pixels PX are set to the off-bias state, the characteristic curve of each driving transistor may become similar or identical, and thus, the uniformity of luminance may be effectively improved.

Figure 13A:
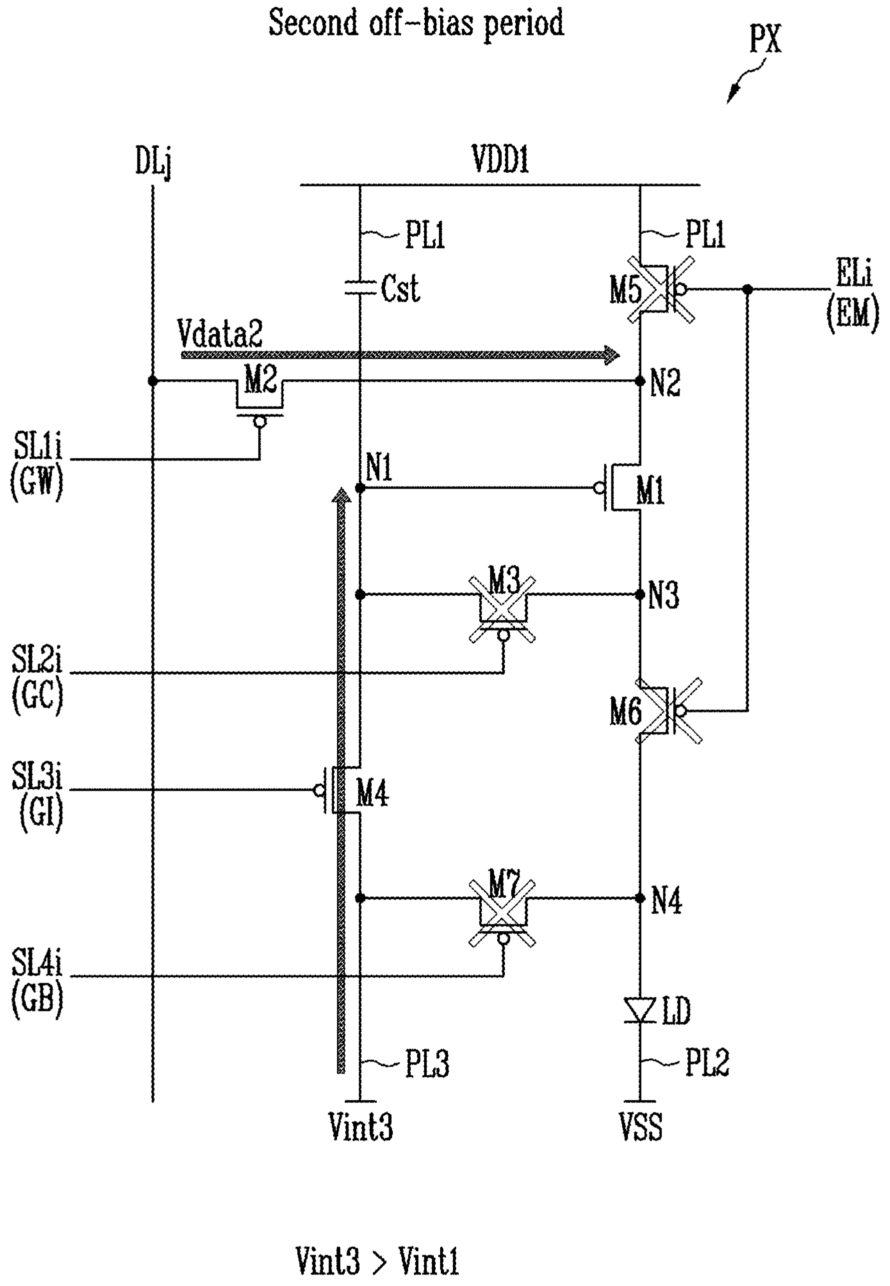
FIGS. 13A and 13B are diagrams illustrating an embodiment of a second off-bias period included in a recovery driving period.
Figure 13B:
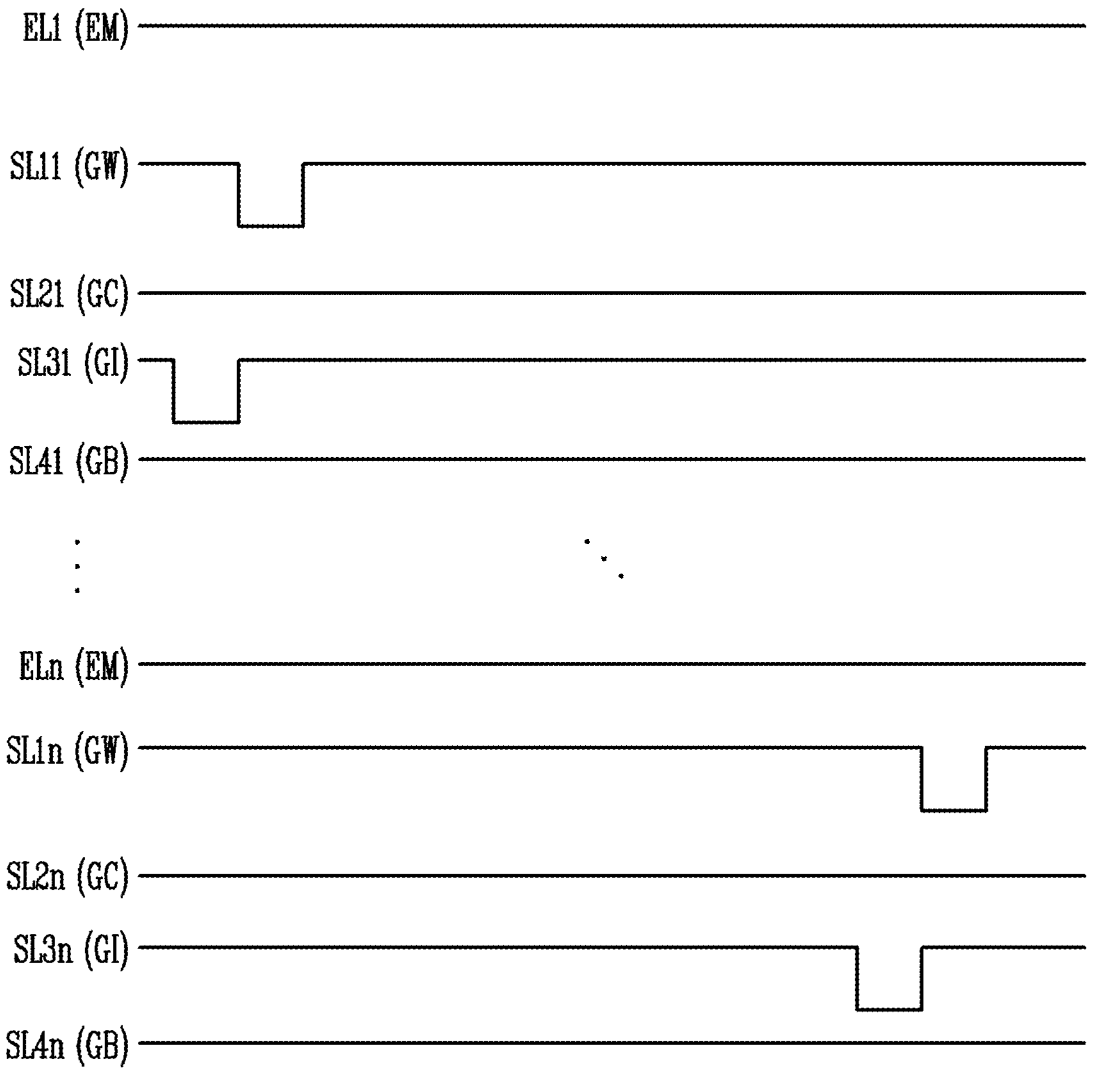

FIGS. 13A and 13B are diagrams illustrating an embodiment of the second off-bias period included in the recovery driving period.

Referring to FIGS. 13A and 13B, during the second off-bias period, the power supply 600 may supply the voltage of the third driving power Vint3 to the third power line PL3 under the control of the timing controller 500. The third initialization power Vint3 may be set to a voltage higher than the first initialization power Vint1.

During the second off-bias period, the scan driver 200 may sequentially supply the first scan signal GW to the first scan lines SL11 to SL1n and may sequentially supply the third scan signal GI to the third scan lines SL31 to SL3n in response to the control of the timing controller 500. The third scan signal GI supplied to the i-th third scan line SL3i may be supplied before the first scan signal GW is supplied to the i-th first scan line SL1i.

During the second off-bias period, the data driver 400 may supply the voltage Vdata2 of the second data signal to the data lines DL1 to DLm in response to the control of the timing controller 500. Here, the second data signal may be a white data signal.

As illustrated in FIG. 13A, when the third scan signal GI is supplied to the third scan line SL3i, the fourth transistor M4 is turned on and the voltage of the third initialization power Vint3 is supplied to the first node N1. When the first scan signal GW is supplied to the first scan line SL1i, the second transistor M2 is turned on and the voltage of the second data signal Vdata2 is supplied to the second node N2.

Here, the voltage of the third initialization power Vint3 is set to a voltage higher than the voltage Vdata2 of the second data signal. In an embodiment, for example, the voltage of the third initialization power Vint3 may be set to 4.5V, and the voltage of the second data signal Vdata2 may be set to 1V. In this case, the voltage Vgs of the first transistor M1 is set to 3.5V, and accordingly, the off-bias voltage may be applied to the first transistor M1. Since the first transistor M1 is set to the turn-off state during the second off-bias period, the light emitting device LD may maintain a non-emission state. When the off-bias voltage is applied to the first transistor M1, the characteristics of the driving transistor may change as illustrated in FIG. 12.

In an embodiment of the present disclosure, the first off-bias period and the second off-bias period are included in order to apply the off-bias voltage to the driving transistor (i.e., the first transistor M1). The voltage Vgs of the driving transistor applied during the first off-bias period is set to be different from the voltage Vgs of the driving transistor applied during the second off-bias period. As such, when the recovery driving period includes the first off-bias period and the second off-bias period, the characteristics of the driving transistor may be quickly set to a desired state.

FIG. 14 is a table illustrating afterimage characteristics corresponding to the voltage of the second initialization power supplied during the on-bias period. The comparative example in FIG. 14 shows a case where the bias voltage is not applied after the normal driving period. In FIG. 14, Vint2 −7V, Vint2 −5V, and Vint2 −2.5V indicate cases where the voltage of the second initialization power Vint2 is set to −7V, −5V, and −2.5V, respectively. In FIG. 14, "min" refers to minute.

In addition, the number located in the table of FIG. 14 may indicate the afterimage level, the row in the table indicates the second initialization power Vint2 (on-bias voltage), and the column in the table indicates time (min) after the second initialization power Vint2 is applied to the driving transistor. In an embodiment, for example, the level of afterimage may be expressed as "0" to "10," with a higher number indicating a higher level of afterimage. In an embodiment, for example, when the afterimage level is "10", it may mean that the afterimage is strongly recognized, and when the afterimage level is "0", it may mean that the afterimage is not recognized. In an embodiment, for example, when the afterimage level is "3" or lower, it may mean that the afterimage is so weak that it is barely visible to the user.

Referring to FIG. 14, when the voltage of the second initialization power Vint2 is set to −7V, it can be seen that there is a low afterimage level after the on-bias period of approximately 8 minutes. Additionally, when the voltage of the second initialization power Vint2 is set to −5V, it can be seen that there is a low level of afterimage after the on-bias period of approximately 10 minutes. When the voltage of the second initialization power Vint2 is set to −2.5V, it can be seen that there is a low afterimage level after the on-bias period of approximately 12 minutes. The voltage of the second initialization power Vint2 may be experimentally set in accordance with the characteristics of the display device 1000 (e.g., inches, resolution, etc.).

In the case of the comparative example that does not undergo the on-bias process, there is a low level of afterimage after approximately 18 minutes. That is, in an embodiment of the present disclosure, the uniformity of luminance may be effectively improved by applying the on-bias voltage to the driving transistor included in each of the pixels PX during the recovery driving period.

FIG. 15 is a table illustrating afterimage characteristics corresponding to the first off-bias period and the second off-bias period.

Referring to FIG. 15, the display device 1000, which has an initial afterimage level of "9", may have an afterimage level of "1" after the first off-bias period of 10 minutes. In addition, the display device 1000, which has an initial afterimage level of "9", may have an afterimage level of "1.5" after the second off-bias period of 10 minutes. Meanwhile, the comparative example that does not undergo the off-bias process may have an afterimage level of "3" after 10 minutes. That is, in an embodiment of the present disclosure, the uniformity of luminance may be effectively improved by passing the off-bias period after the normal driving period.

In addition, the recovery driving period may include an on-bias period, a first off-bias period, and a second off-bias period. When a period of applying different bias voltages is included, the afterimage level may be lowered more quickly.

Figure 16:
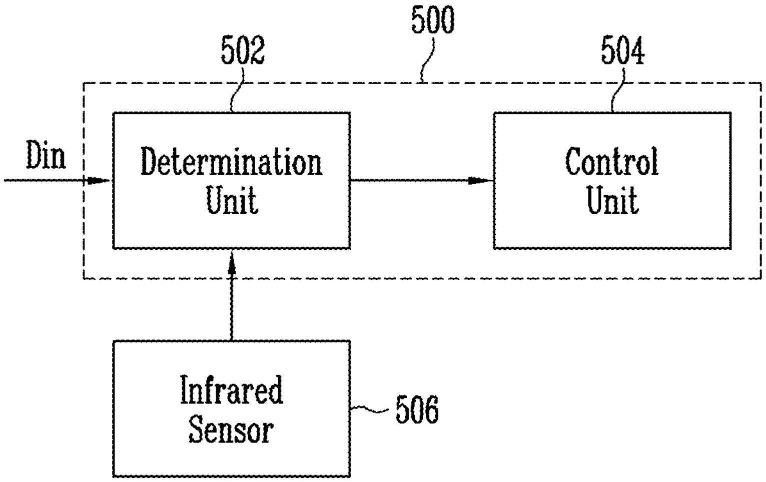
FIGS. 16 and 17 are diagrams illustrating an embodiment of a timing controller illustrated in FIG. 3.
Figure 17:
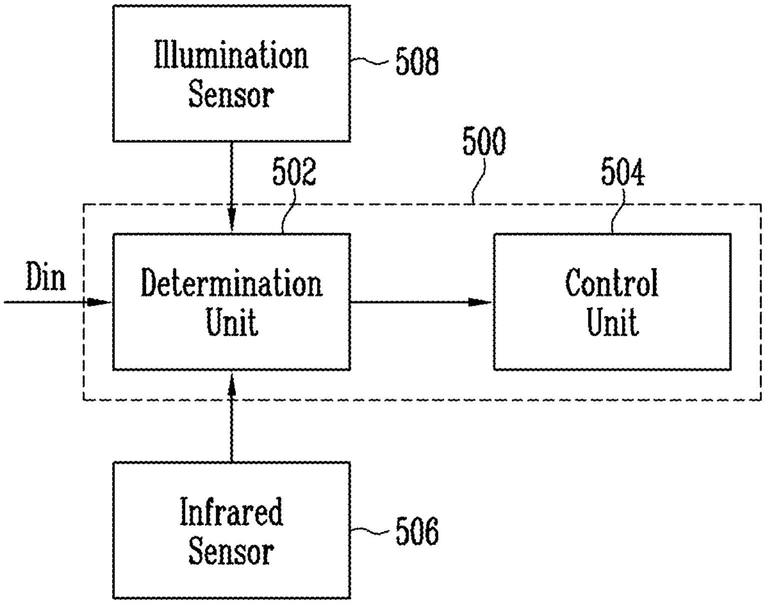

FIGS. 16 and 17 are diagrams illustrating an embodiment of the timing controller illustrated in FIG. 3.

Referring to FIG. 16, the timing controller 500 may include a determination unit 502 and a control unit 504. The determination unit 502 may be electrically connected to the infrared sensor 506. The infrared sensor 506 may be arranged to overlap the first pixel area PA1 and may supply infrared light to the first pixel area PA1.

The determination unit 502 may receive input data Din during the normal driving period. In addition, the determination unit 502 may accumulate the input data Din to generate a brightness value (for example, an average value). Here, the brightness value may include luminance information of the image displayed in the pixel unit 100.

The determination unit 502 may use the input data Din to determine whether a specific pattern is displayed in the pixel unit 100, and may generate a pattern information value in response thereto. Here, the "specific pattern" may be an image in which a lot of afterimages occur. In an embodiment, for example, the specific pattern may be an image in which white is displayed on a black background. In an embodiment, for example, the specific pattern may be an image that includes a user interface ("UI") that generates a lot of afterimages.

The determination unit 502 may be connected to the infrared sensor 506 and may determine the driving time of the infrared sensor 506. Here, the driving time of the infrared sensor 506 may correspond to the driving time of the display device 1000. The determination unit 502 may supply the brightness value, the pattern information value, and the driving time information to the control unit 504. In addition, the determination unit 502 may determine the driving time of the display device 1000 by using the time at which the input data Din is inputted.

The control unit 504 may control the length of the recovery driving period, the length of the on-bias period included in the recovery driving period, the length of the first off-bias period, and the length of the second off-bias period by using the brightness value, the pattern information value, and/or the driving time information.

In an embodiment, the control unit 504 may set the recovery driving period to be long when the specific pattern is continuously displayed in the pixel unit 100 for a long period of time.

In an embodiment, when the brightness value is greater than or equal to the first threshold, the control unit 504 may determine that the pixel unit 100 displays a bright screen, may include the on-bias period in the recovery driving period, and may increase the length of the on-bias period.

In an example, when the brightness value is less than or equal to the second threshold, the control unit 504 may determine that the pixel unit 100 displays a dark screen, may include the first off-bias period and/or the second off-bias period in the recovery driving period, and may increase the length of the first off-bias period and/or the second off-bias period. Here, the second threshold may have a value less than the first threshold.

In an embodiment, all of the on-bias period, the first off-bias period, and the second off-bias period may be included in the recovery driving period. The control unit 504 may control the length of the on-bias period, the first off-bias period, and/or the second off-bias period in response to the brightness value, the pattern information value, and the driving time.

In an embodiment, the recovery driving period may include at least one of the on-bias period, the first off-bias period, and the second off-bias period under the control of the control unit 504.

Referring to FIG. 17, the display device 1000 may additionally include an illumination sensor 508. The illumination sensor 508 may measure the luminance (or brightness) of the pixel unit 100 and provide brightness information to the determination unit 502. In this case, the determination unit 502 may generate the brightness value by using the brightness information supplied from the illumination sensor 508.

Figure 18:
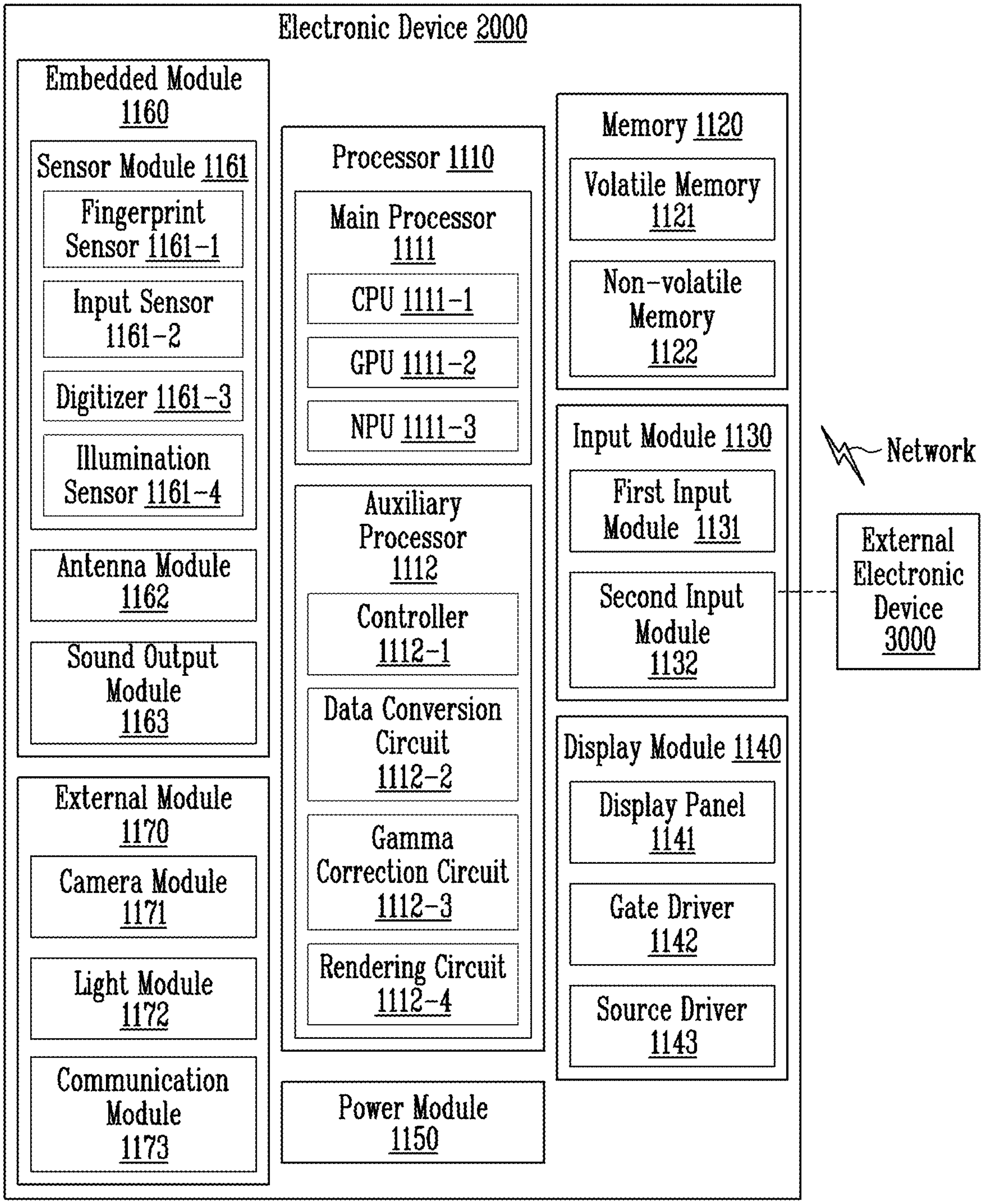
FIG. 18 is a diagram illustrating an electronic device in accordance with an embodiment of the present disclosure.

FIG. 18 is a diagram illustrating an electronic device in accordance with an embodiment of the present disclosure.

Referring to FIG. 18, an electronic device 2000 in accordance with an embodiment of the present disclosure outputs a variety of information through the display module 1140. When a processor 1110 executes the application stored in the memory 1120, the display module 1140 provides application information to the user through a display panel 1141.

The processor 1110 obtains external input through an input module 1130 or a sensor module 1161 and executes an application corresponding to the external input. In an embodiment, for example, when a user selects a camera icon (or a camera application icon) displayed on the display panel 1141, the processor 1110 obtains a user input through an input sensor 1161-2 and activates a camera module 1171. The processor 1110 transmits, to the display module 1140, image data corresponding to the captured image acquired through the camera module 1171. The display module 1140 may display an image corresponding to the captured image through the display panel 1141.

As another example, when personal information authentication is executed in the display module 1140, a fingerprint sensor 1161-1 obtains input fingerprint information as input data. The processor 1110 compares the input data obtained through the fingerprint sensor 1161-1 with authentication data stored in the memory 1120, and executes the application according to a comparison result. The display module 1140 may display information executed according to the logic of the application through the display panel 1141. The fingerprint sensor 1161-1 may be arranged to obtain fingerprint information from the entire area of the display module 1140 (or the display panel 1141).

As another example, when a music streaming icon displayed on the display module 1140 is selected, the processor 1110 obtains a user input through the input sensor 1161-2 and activates a music streaming application stored in the memory 1120. When a music play command is inputted from the music streaming application, the processor 1110 activates a sound output module 1163 to provide, to the user, sound information corresponding to the music play command.

The operation of the electronic device 2000 has been briefly described. The configuration of the electronic device 2000 is described in detail below. Some components of the electronic device 2000, which is described below, may be integrated and provided as one component, or one component may be provided separately into two or more components.

The electronic device 2000 may communicate with an external electronic device 3000 through a network (e.g., a short-range wireless communication network or a long-range wireless communication network). In accordance with an embodiment, the electronic device 2000 may include a processor 1110, a memory 1120, an input module 1130, a display module 1140, a power module 1150, an embedded module 1160, and an external module 1170. In accordance with an embodiment, the electronic device 2000 may omit at least one of the above-described components or add one or more other components. In accordance with an embodiment, some of the above-described components (e.g., the sensor module 1161, the antenna module 1162, or the sound output module 1163) may be integrated into another component (e.g., the display module 1140).

The processor 1110 may execute software to control one or more other elements (e.g., hardware or software elements, etc.) of the electronic device 2000 connected to the processor 1110, and may execute various data processing or operations. In accordance with an embodiment, as at least part of data processing or operations, the processor 1110 may store, in a volatile memory 1121, commands or data received from other elements (e.g., an input module 1130, a sensor module 1161, or the communication module 1173), may process the commands or data stored in the volatile memory 1121, and may store result data in a non-volatile memory 1122.

The processor 1110 may include a main processor 1111 and an auxiliary processor 1112. The main processor 1111 may include one or more of a central processing unit ("CPU") 1111-1 or an application processor (AP). The main processor 1111 may further include one or more of a graphics processing unit 1111-2, a graphic processing unit ("GPU"), a communication processor ("CP"), and an image signal processor ("ISP"). The main processor 1111 may further include a neural processing unit ("NPU") 1111-3. The NPU 1111-3 is a processor specialized for processing an artificial intelligence model, and the artificial intelligence model may be generated through machine learning. The artificial intelligence model may include a plurality of artificial neural network layers. The artificial intelligence model may be a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), a deep Q-network, or a combination of two or more thereof, but the present disclosure is not limited to the above example. The artificial intelligence model may additionally or alternatively include a software structure in addition to the hardware structure. At least two of the above-described processing units and processors may be implemented as an integrated configuration (e.g., a single chip), or may be implemented as an independent configuration (e.g., a plurality of chips).

The auxiliary processor 1112 may include a controller 1112-1. The controller 1112-1 may include an interface conversion circuit and a timing control circuit. The controller 1112-1 receives an image signal from the main processor 1111, converts the data format of the image signal to match the interface specifications with the display module 1140, and outputs image data. The controller 1112-1 may output various control signals for driving the display module 1140.

The auxiliary processor 1112 may further include a data conversion circuit 1112-2, a gamma correction circuit 1112-3, a rendering circuit 1112-4, and a touch control circuit. The data conversion circuit 1112-2 may receive image data from the controller 1112-1, may compensate the image data so that the image is displayed at a desired brightness according to the characteristics of the electronic device 2000 or the user's settings, etc., and may convert the image data so as to reduce power consumption or compensate for afterimages.

The controller 1112-1 and the data conversion circuit 1112-2 may include the timing controller 500 illustrated in FIG. 3. In an embodiment, for example, the controller 1112-1 and the data conversion circuit 1112-2 may be provided with a single IC, and the IC may include the timing controller 500, for example, the determination unit 502 and the control unit 504 illustrated in FIGS. 16 and 17.

The gamma correction circuit 1112-3 may convert image data or a gamma reference voltage so that an image displayed on the electronic device 2000 has desired gamma characteristics. The rendering circuit 1112-4 may receive the image data from the controller 1112-1 and render the image data by considering the pixel arrangement of the display panel 1141 applied to the electronic device 2000.

The touch control circuit may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, and the touch control circuit may be integrated into other components (e.g., the main processor 1111 or the controller 1112-1). At least one of the data conversion circuit 1112-2, the gamma correction circuit 1112-3, and the rendering circuit 1112-4 may be integrated into a source driver 1143, which will be described below.

The memory 1120 may store various data used by at least one component of the electronic device 2000 (e.g., the processor 1110 or the sensor module 1161) and input data or output data for commands related thereto. In addition, various setting data corresponding to the user's settings may be stored in the memory 1120. The memory 1120 may include at least one of the volatile memory 1121 and the non-volatile memory 1122.

The input module 1130 may receive commands or data to be used for components of the electronic device 2000 (e.g., the processor 1110, the sensor module 1161, or the sound output module 1163) from outside the electronic device 2000 (e.g., a user or an external electronic device 3000).

The input module 1130 may include a first input module 1131 through which the commands or data are inputted from the user, and a second input module 1132 through which the commands or data are inputted from the external electronic device 3000. The first input module 1131 may include a microphone, a mouse, a keyboard, keys (e.g., buttons), or a pen (e.g., a passive pen or an active pen). The second input module 1132 may support a designated protocol that may connect to the external electronic device 3000 in a wire or wireless manner. In accordance with an embodiment, the second input module 1132 may include a high definition multimedia interface ("HDMI"), a universal serial bus ("USB") interface, a secure digital ("SD") card interface, or an audio interface. The second input module 1132 may include a connector that can be physically connected to the external electronic device 3000, for example, an HDMI connector, a USB connector, an SD card connector, or an audio connector (e.g., a headphone connector).

The display module 1140 visually provides information to the user. The display module 1140 may include a display panel 1141, a gate driver 1142, and a source driver 1143. The display module 1140 may further include a window, a chassis, and a bracket to protect the display panel 1141.

The display panel 1141 (or the display) may include a liquid crystal display panel, an organic light emitting display panel, or an inorganic light emitting display panel, and the type of the display panel 1141 is not particularly limited. The display panel 1141 may be a rigid type or a flexible type that is rollable or foldable. The display module 1140 may further include a supporter, a bracket, or a heat dissipation member that supports the display panel 1141.

The gate driver 1142 may be mounted on the display panel 1141 as a driving chip. In addition, the gate driver 1142 may be integrated into the display panel 1141. In an embodiment, for example, the gate driver 1142 may include an amorphous silicon TFT gate driver circuit ("ASG"), a low temperature polycrystalline silicon ("LTPS") TFT gate driver circuit, or an oxide semiconductor TFT gate driver circuit ("OSG") built in the display panel 1141. The gate driver 1142 receives a control signal from the controller 1112-1 and outputs scan signals to the display panel 1141 in response to the control signal. The gate driver 1142 may include the scan driver 200 illustrated in FIG. 3.

The display module 1140 may further include an emission driver. The emission driver outputs an emission control signal to the display panel 1141 in response to the control signal received from the controller 1112-1. The emission driver may be formed separately from the gate driver 1142 or may be integrated into the gate driver 1142. The emission driver may include the emission driver 300 illustrated in FIG. 3.

The source driver 1143 receives the control signal from the controller 1112-1, converts image data into an analog voltage (e.g., a data signal) in response to the control signal, and then outputs the data signals to the display panel 1141. The source driver 1143 may include the data driver 400 illustrated in FIG. 3.

The source driver 1143 may be integrated into other components (e.g., the controller 1112-1). The functions of the interface conversion circuit and the timing control circuit of the controller 1112-1 may be integrated into the source driver 1143.

The display module 1140 may further include a voltage generation circuit. The voltage generation circuit may output various voltages for driving the display panel 1141. The voltage generation circuit may include the power supply 600 illustrated in FIG. 3. In an embodiment, the display panel 1141 may include a plurality of pixel columns, each of which includes a plurality of pixels.

In an embodiment, the source driver 1143 may convert data corresponding to red (R), green (G), and blue (B) included in the image data received from the processor 1110 into a red data signal (or data voltage), a green data signal, and a blue data signal, and may provide the red data signal, the green data signal, and the blue data signal to a plurality of pixel columns included in the display panel 1141 during one horizontal period.

The power module 1150 supplies power to components of the electronic device 2000. The power module 1150 may include a battery that charges power voltage. The battery may include a non-rechargeable primary cell, a rechargeable secondary cell, or a fuel cell. The power module 1150 may include a power management integrated circuit ("PMIC"). The PMIC supplies optimized power to each of the modules described above and modules described below. The power module 1150 may include a wireless power transmission/reception member electrically connected to the battery. The wireless power transmission/reception member may include a plurality of coil-shaped antenna radiators.

The electronic device 2000 may further include the embedded module 1160 and the external module 1170. The embedded module 1160 may include a sensor module 1161, an antenna module 1162, and a sound output module 1163. The external module 1170 may include a camera module 1171, a light module 1172, and a communication module 1173.

The sensor module 1161 may detect an input by the user's body or an input by the pen of the first input module 1131, and may generate an electrical signal or data value corresponding to the input. The sensor module 1161 may include at least one of a fingerprint sensor 1161-1, an input sensor 1161-2, a digitizer 1161-3, and an illumination sensor 1161-4.

The fingerprint sensor 1161-1 may generate a data value corresponding to the user's fingerprint. The fingerprint sensor 1161-1 may include either an optical fingerprint sensor or a capacitive fingerprint sensor.

The input sensor 1161-2 may generate a data value corresponding to coordinate information of the input by the user's body or the pen. The input sensor 1161-2 generates the amount of change in capacitance caused by the input as the data value. The input sensor 1161-2 may detect an input by a passive pen or transmit and receive data to and from an active pen. The fingerprint sensor 1161-1 and/or the input sensor 1161-2 may include the infrared sensor 506 illustrated in FIGS. 16 and 17.

The input sensor 1161-2 may measure biological signals such as blood pressure, moisture, or body fat. In an embodiment, for example, when the user touches a part of the body to the sensor layer or sensing panel and does not move for a certain period of time, the input sensor 1161-2 may detect biological signals and output information desired by the user to the display module 1140, based on a change in electric field caused by the part of the body.

The digitizer 1161-3 may generate a data value corresponding to coordinate information of the input by the pen. The digitizer 1161-3 generates the amount of electromagnetic change caused by the input as the data value. The digitizer 1161-3 may detect the input by the passive pen or may transmit and receive data to and from the active pen.

The illumination sensor 1161-4 may measure the luminance of the display panel 1141 and may provide brightness information to the controller 1112-1. The illumination sensor 1161-4 may include the illumination sensor 508 illustrated in FIG. 17.

At least one of the fingerprint sensor 1161-1, the input sensor 1161-2, the digitizer 1161-3, and the illumination sensor 1161-4 may be implemented as a sensor layer formed on the display panel 1141 through a continuous process. At least one of the fingerprint sensor 1161-1, the input sensor 1161-2, the digitizer 1161-3, and the illumination sensor 1161-4 may be disposed above the display panel 1141, and one of the fingerprint sensor 1161-1, the input sensor 1161-2, the digitizer 1161-3, and the illumination sensor 1161-4, for example, the digitizer 1161-3, may be disposed below the display panel 1141.

At least two of the fingerprint sensor 1161-1, the input sensor 1161-2, the digitizer 1161-3, and the illumination sensor 1161-4 may be integrated into a single sensing panel through the same process. When integrated into a single sensing panel, the sensing panel may be disposed between the display panel 1141 and the window disposed above the display panel 1141. In accordance with an embodiment, the sensing panel may be disposed on a window, and the position of the sensing panel is not particularly limited.

At least one of the fingerprint sensor 1161-1, the input sensor 1161-2, the digitizer 1161-3, and the illumination sensor 1161-4 may be built into the display panel 1141. That is, at least one of the fingerprint sensor 1161-1, the input sensor 1161-2, the digitizer 1161-3, and the illumination sensor 1161-4 may be formed simultaneously through the process of forming elements (e.g., the light emitting device, the transistors, etc.) included in the display panel 1141.

In addition, the sensor module 1161 may generate an electrical signal or data value corresponding to the internal state or external state of the electronic device 2000. The sensor module 1161 may further include, for example, a gesture sensor, a gyro sensor, a barometric pressure sensor, a magnetic sensor, an acceleration sensor, a grip sensor, a proximity sensor, a color sensor, an infrared ("IR") sensor, a biometric sensor, a temperature sensor, and/or a humidity sensor.

The antenna module 1162 may include one or more antennas for transmitting or receiving signals or power to the outside. In accordance with an embodiment, the communication module 1173 may transmit a signal to the external electronic device 3000 or receive a signal from the external electronic device 3000 through an antenna suitable for the communication method. The antenna pattern of the antenna module 1162 may be integrated into one component of the display module 1140 (e.g., the display panel 1141) or the input sensor 1161-2.

The sound output module 1163 is a device for outputting sound signals to the outside of the electronic device 2000, and may include, for example, a speaker used for general purposes such as multimedia playback or recording playback, and a receiver used exclusively for receiving phone calls. In accordance with an embodiment, the receiver may be formed integrally with the speaker or separately from the speaker. The sound output pattern of the sound output module 1163 may be integrated into the display module 1140.

The camera module 1171 may capture a still image and a moving image. In accordance with an embodiment, the camera module 1171 may include one or more lenses, an image sensor, or an image signal processor. The camera module 1171 may further include an infrared camera capable of measuring the presence or absence of the user, the user's location, and the user's gaze.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 2000 and the external electronic device 3000 and may support performance of communication through the established communication channel. The communication module 1173 may include one or all of a wireless communication module, such as a cellular communication module, a short-range wireless communication module, or a global navigation satellite system ("GNSS") communication module, and a wired communication modules such as a local area network ("LAN") communication module or a power line communication module. The communication module 1173 may communicate with the external electronic device 3000 through a short-range communication network such as Bluetooth, WiFi direct, or infrared data association ("IrDA"), or a long-range communication network such as a cellular network, the Internet, or a computer network (e.g., a LAN or a WAN). The various types of communication modules 1173 described above may be implemented as a single chip or may be implemented as separate chips.

The input module 1130, the sensor module 1161, the camera module 1171, or the like may be used to control the operation of the display module 1140 in conjunction with the processor 1110.

The processor 1110 outputs commands or data to the display module 1140, the sound output module 1163, the camera module 1171, or the light module 1172 based on the input data received from the input module 1130. In an embodiment, for example, the processor 1110 may generate image data in response to input data applied through a mouse or an active pen and outputs the image data to the display module 1140, or may generate command data in response to the input data and output the command data to the camera module 1171 or the light module 1172. When the input data is not received from the input module 1130, the processor 1110 may reduce power consumed by the electronic device 2000 by switching the operation mode of the electronic device 2000 to a low-power mode or a sleep mode.

The processor 1110 outputs commands or data to the display module 1140, the sound output module 1163, the camera module 1171, or the light module 1172 based on the sensing data received from the sensor module 1161. In an embodiment, for example, the processor 1110 may compare authentication data authorized by the fingerprint sensor 1161-1 with authentication data stored in the memory 1120 and then execute an application according to the comparison result. The processor 1110 may execute commands or output corresponding image data to the display module 1140 based on sensing data detected by the input sensor 1161-2 or the digitizer 1161-3. When the sensor module 1161 includes a temperature sensor, the processor 1110 may receive temperature data about the measured temperature from the sensor module 1161 and further perform luminance correction on the image data based on the temperature data.

The processor 1110 may receive, from the camera module 1171, measurement data about the presence or absence of the user, the user's location, the user's gaze, etc. The processor 1110 may further perform luminance correction on the image data based on the measurement data. In an embodiment, for example, the processor 1110 that determines the presence or absence of the user through the input from the camera module 1171 may output, to the display module 1140, image data whose luminance has been corrected through the data conversion circuit 1112-2 or the gamma correction circuit 1112-3.

Some of the components described above may be connected to each other through a communication method between peripheral devices, for example, a bus, a general purpose input/output ("GPIO"), a serial peripheral interface ("SPI"), a mobile industry processor interface ("MIPI"), or an ultra path interconnect ("UPI") link, and may exchange signals (e.g., commands or data) with each other. The processor 1110 may communicate with the display module 1140 through a prearranged interface. In an embodiment, for example, the processor 1110 may use any one of the communication methods described above and is not limited to the communication methods described above.

In a display device and a method of driving the same in accordance with embodiments of the present disclosure, uniformity of luminance may be effectively improved by applying a bias voltage to a driving transistor included in each pixel during a recovery driving period in which the pixels do not emit light.

In addition, in an embodiment of the present disclosure, since the recovery driving period includes an on-bias period and/or an off-bias period, the characteristics of the driving transistor may be initialized within a short time.

Furthermore, in an embodiment of the present disclosure, the length of the recovery driving period, the length of the on-bias period and/or the off-bias period included in the recovery driving period are controlled by using at least one of the driving time of the pixel unit, the brightness of the pixel unit, and the pattern value of the image, thereby effectively initializing the characteristics of the driving transistor.

However, the effects of the present disclosure are not limited to the above-described effects, and may be variously expanded without departing from the spirit and scope of the present disclosure.

Although the present disclosure has been described with reference to the embodiments, it will be understood by those of ordinary skill in the art that various modifications and changes can be made thereto without departing from the spirit and scope of the present disclosure as set forth in the appended claims.

What is claimed is:

1. A display device comprising:

pixels connected to scan lines, data lines, a first power line, a second power line, and a third power line, wherein each of the pixels includes a light emitting device and a driving transistor for controlling an amount of current supplied to the light emitting device; and a timing controller for generating output data by using input data, wherein the pixels are configured to emit light in response to a data signal corresponding to the output data during a normal driving period, and receive a bias voltage during a recovery driving period in which the pixels do not emit light after the normal driving period, and wherein the timing controller is configured to control a length of the recovery driving period in response to at least one of a brightness value of the pixels displayed in the normal driving period and a pattern information value of an image displayed in the pixels, the bias voltage being provided independently of the data signal corresponding to the output data.

2. The display device of claim 1, wherein the recovery driving period includes at least one of an on-bias period in which an on-bias voltage is applied to the driving transistor and a first off-bias period and a second off-bias period in which an off-bias voltage is applied to the driving transistor.

3. The display device of claim 2, further comprising a power supply configured to supply a voltage of an operating power to the second power line so as to receive a driving current supplied from the pixels during the normal driving period and the recovery driving period.

4. The display device of claim 3, wherein the power supply is configured to supply to the first power line, a first driving power having a voltage higher than the operating power and supply, to the third power line, a first initialization power having a voltage lower than the data signal supplied to the data lines during the normal driving period.

5. The display device of claim 4, further comprising:

a data driver for driving the data lines; and a scan driver for driving the scan lines.

6. The display device of claim 5, wherein the power supply is configured to supply, to the first power line, a second driving power having a voltage lower than the first driving power and supply the first initialization power to the third power line during the first off-bias period, and the data driver is configured to supply, to the data lines, a voltage of a first data signal having a voltage higher than the second driving power during the first off-bias period.

7. The display device of claim 6, wherein the first data signal is a black data signal.

8. The display device of claim 5, wherein the power supply is configured to supply the first driving power to the first power line and supply, to the third power line, a third initialization power having a voltage higher than the first initialization power during the second off-bias period, and the data driver is configured to supply, to the data lines, a voltage of a second data signal having a voltage lower than the third driving power during the second off-bias period.

9. The display device of claim 4, wherein the power supply is configured to supply the first driving power to the first power line and supply, to the third power line, a second initialization power having a voltage lower than the first initialization power during the on-bias period.

10. The display device of claim 2, wherein the timing controller is configured to control a length of the on-bias period, a length of the first off-bias period, and a length of the second off-bias period in response to at least one of the brightness value and the pattern information value.

11. The display device of claim 10, further comprising an infrared sensor overlapping at least some of the pixels.

12. The display device of claim 11, wherein the timing controller comprises:

a determination unit for generating the brightness value and the pattern information value by using the input data and determining a driving time by using an operating time of the infrared sensor; and a control unit for controlling the length of the recovery driving period, the length of the on-bias period, the length of the first off-bias period, and the length of the second off-bias period by using at least one of the brightness value, the pattern information value, and the driving time.

13. The display device of claim 10, wherein the timing controller comprises:

a determination unit for determining at least one of the brightness value and the pattern information value by using the input data; and a control unit for controlling the length of the recovery driving period, the length of the on-bias period, the length of the first off-bias period, and the length of the second off-bias period by using at least one of the brightness value and the pattern information value.

14. The display device of claim 2, wherein the timing controller is configured to include at least one of the on-bias period, the first off-bias period, and the second off-bias period in the recovery driving period in response to at least one of the brightness value and the pattern information value.

15. The display device of claim 1, further comprising an illumination sensor for measuring brightness of the pixels, wherein the timing controller is configured to generate the brightness value by using the illumination sensor.

16. A display device comprising:

pixels connected to scan lines, data lines, a first power line, a second power line, and a third power line, wherein each of the pixels includes a light emitting device and a driving transistor for controlling an amount of current supplied to the light emitting device; and a timing controller for generating output data by using input data, wherein the pixels are configured to emit light in response to a data signal corresponding to the output data during a normal driving period, and receive a bias voltage during a recovery driving period in which the pixels do not emit light after the normal driving period, the recovery driving period includes at least one of an on-bias voltage application period and an off-bias voltage application period, and the timing controller is configured to control a length of the on-bias voltage application period and a length of the off-bias voltage application period in response to the input data, where in the display device further comprises a power supply configured to supply a voltage of an operating power to the second power line so as to receive a driving current supplied from the pixels during the normal driving period and the recovery driving period, wherein the power supply is configured to supply to the first power line, a first driving power having a voltage higher than the operating power and supply, to the third power line, a first initialization power having a voltage lower than a data signal supplied to the data lines during the normal driving period.

17. The display device of claim 16, wherein the timing controller is configured to control the length of the on-bias voltage application period and the length of the off-bias voltage application period by using at least one of a brightness value of the pixels displayed in the normal driving period, a pattern information value of an image displayed by the pixels, and a driving time of the pixels.

18. A method of driving a display device, the method comprising:

displaying a certain image in pixels of the display device corresponding to input data during a normal driving period;

applying at least one of an on-bias voltage and an off-bias voltage to a driving transistor included in each of the pixels during a recovery driving period in which the pixels do not emit light; and changing at least one of a length of the recovery driving period, a length of a period in which the on-bias voltage is applied, and a length of a period in which the off-bias voltage is applied in response to at least one of brightness information of the pixels during the normal driving period, and pattern information of an image displayed by the pixels during the normal driving period.

19. An electronic device comprising:

a display panel including pixels configured to display a certain image during a normal driving period;

an illumination sensor configured to measure luminance of the display panel and generate a brightness value of the pixels displayed in the normal driving period; and a controller configured to apply at least one of an on-bias voltage and an off-bias voltage to a driving transistor included in each of the pixels during a recovery driving period in response to the brightness value, wherein a length of a period in which the on-bias voltage is applied and a length of a period in which the off-bias voltage is applied are changed in response to the brightness value.

* * * * *